US012725896B2

(12) United States Patent
Manzoni et al.

(10) Patent No.: US 12,725,896 B2
(45) Date of Patent: Sep. 1, 2026

(54) RADIO FREQUENCY FILTERS INCLUDING FILTER BANKS FORMED BY PLURAL RESONATORS THAT ARE COVERED BY FEED BOARDS

(71) Applicant: CommScope Italy S.R.L., Agrate Brianza (IT)

(72) Inventors: Andrea Manzoni, Missaglia (IT); Giuseppe Resnati, Seregno (IT)

(73) Assignee: COMMSCOPE ITALY S.R.L. (IT)

( * ) Notice: Subject to any disclaimer, the term of this patent is extended or adjusted under 35 U.S.C. 154(b) by 84 days.

(21) Appl. No.: 18/846,756

(22) PCT Filed: Apr. 21, 2023

(86) PCT No.: PCT/EP2023/060415
§ 371 (c)(1),
(2) Date: Sep. 13, 2024

(87) PCT Pub. No.: WO2023/208759
PCT Pub. Date: Nov. 2, 2023

(65) Prior Publication Data

US 2025/0202087 A1 Jun. 19, 2025

(30) Foreign Application Priority Data

Apr. 28, 2022 (IT) ........................ 102022000008411

(51) Int. Cl.

| | |
|---|---|
| ***H01P 1/213*** | (2006.01) |
| ***H01P 1/203*** | (2006.01) |
| ***H01Q 1/24*** | (2006.01) |

(52) U.S. Cl.
CPC ............ *H01P 1/2136* (2013.01); *H01P 1/203* (2013.01); *H01P 1/213* (2013.01); *H01P 1/2135* (2013.01); *H01P 1/2138* (2013.01); *H01Q 1/246* (2013.01)

(58) Field of Classification Search
CPC ...... H01P 1/213; H01P 1/2135; H01P 1/2136; H01P 1/2138

(Continued)

(56) References Cited

U.S. PATENT DOCUMENTS

| | | | | |
|---|---|---|---|---|
| 5,225,799 A | | 7/1993 | West et al. | |
| 5,554,960 A | * | 9/1996 | Ohnuki et al. | H03H 9/725 333/132 |

(Continued)

FOREIGN PATENT DOCUMENTS

| | | |
|---|---|---|
| CN | 109509946 A | 3/2019 |
| WO | 2017165512 A1 | 9/2017 |
| WO | 2021261923 A1 | 12/2021 |

OTHER PUBLICATIONS

Notification of Transmittal of the International Search Report and the Written Opinion of the International Searching Authority, or the Declaration, in corresponding PCT Application No. PCT/EP2023/060415 (Jan. 12, 2023).

*Primary Examiner* — Benny T Lee
(74) *Attorney, Agent, or Firm* — Myers Bigel, P.A.

(57) ABSTRACT

Radio frequency (RF) devices are provided. An RF device includes a filter bank including a plurality of RF filters that each have a plurality of resonators. Moreover, the RF device includes a feed board that covers and is coupled to the filter bank. The resonators include in-line resonators and/or resonators that are part of a printed circuit board.

19 Claims, 26 Drawing Sheets

(58) Field of Classification Search
USPC .......................................................... 333/134
See application file for complete search history.

(56) References Cited

U.S. PATENT DOCUMENTS

| | | | | |
|---|---|---|---|---|
| 10,601,120 | B2 | 3/2020 | Bisiules et al. | |
| 2003/0107459 | A1* | 6/2003 | Takahashi et al. ... | H01P 1/2088 333/230 |
| 2007/0139135 | A1* | 6/2007 | Ammar et al. ....... | H01P 1/2138 333/135 |
| 2020/0194857 | A1 | 6/2020 | Tamiazzo | |
| 2021/0226310 | A1 | 7/2021 | Jia et al. | |
| 2023/0170615 | A1 | 6/2023 | Hamdy et al. | |

* cited by examiner

RADIO FREQUENCY FILTERS INCLUDING FILTER BANKS FORMED BY PLURAL RESONATORS THAT ARE COVERED BY FEED BOARDS

CLAIM OF PRIORITY

The present application is a 35 U.S.C. § 371 national stage application of PCT Application No. PCT/EP2023/060415, filed Apr. 21, 2023, which claims priority to Italian Application No. 102022000008411, filed Apr. 28, 2022, the entire contents of which are incorporated herein by reference. The above-referenced PCT Application was published in the English language as International Publication No. WO 2023/208759 A1 on Nov. 2, 2023.

FIELD

The present disclosure relates to communications systems and, in particular, to radio frequency ("RF") filters.

BACKGROUND

Base station antennas for wireless communications systems are used to provide cellular communications service to fixed and mobile users that are within defined coverage areas of the respective base station antennas. These base station antennas typically include one or more linear arrays or two-dimensional arrays of radiating elements, such as dipole, or crossed-dipole, radiating elements that act as individual antenna elements. Each of these arrays may be connected to one or more RF ports. The RF ports are used to pass RF signals between the arrays and one or more radios.

Example base station antennas are discussed in International Publication No. WO 2017/165512 to Bisiules, U.S. patent application Ser. No. 15/921,694 to Bisiules et al., and U.S. Provisional Patent Application No. 63/024,846 to Hamdy et al., the disclosures of which are hereby incorporated herein by reference in their entireties. Many cellular base stations include RF filters that are mounted within a base station antenna or on an antenna tower adjacent the base station antenna. As an example, a cellular base station may include (i) a base station antenna having one or more arrays of radiating elements, (ii) a radio that is coupled to the array(s), and (iii) one or more RF filters that are coupled between the radio and the array(s). For example, the RF filter(s) may be part of an RF feed network for the array(s).

SUMMARY OF THE INVENTION

An RF device, according to some embodiments, may include a filter bank that includes a plurality of RF filters that each have a plurality of resonators. Moreover, the RF device may include a feed board that covers and is coupled to the filter bank.

In some embodiments, the filter bank may include two metal shells that separate the resonators of different ones of the RF filters from each other. Moreover, the resonators of all of the RF filters may be part of a single flat piece that is between the two metal shells.

According to some embodiments, the filter bank may include a conductive housing having a plurality of inner walls that separate the resonators of different ones of the RF filters from each other. The resonators of a first of the RF filters may be part of a first flat piece that is supported by a first ledge portion of a first of the inner walls. Moreover, the resonators of a second of the RF filters may be part of a second flat piece that is supported by a second ledge portion of a second of the inner walls.

In some embodiments, the filter bank may include a conductive housing having a plurality of inner walls that separate the resonators of different ones of the RF filters from each other. Moreover, the resonators and the inner walls may all be part of a single piece.

According to some embodiments, a first surface of the feed board may have a plurality of radiating elements thereon. A second surface of the feed board may have a ground plane thereon and may be opposite the first surface. The ground plane may cover the resonators. Moreover, the RF device may include a tuning lid that is opposite the ground plane, and the resonators may be respective planar resonators that are between the tuning lid and the ground plane.

In some embodiments, the RF device may include first and second RF connectors that couple the resonators of a first of the RF filters to the feed board. The resonators of the first of the RF filters may include eleven in-line resonators that are between the first and second RF connectors. Moreover, the resonators of the first of the RF filters may include first and second outermost resonators that are not between the first and second RF connectors.

According to some embodiments, the RF device may include a printed circuit board ("PCB"). The resonators of a first of the RF filters may be in line with each other and may be part of the PCB. Moreover, the resonators of a second of the RF filters may be in line with each other and may be part of the PCB.

In some embodiments, the RF device may include a PCB. A first of the resonators of a first of the RF filters may be part of the PCB and may be opposite and coupled to two others of the resonators of the first of the RF filters. Moreover, a first of the resonators of a second of the RF filters may be part of the PCB and may be opposite and coupled to two others of the resonators of the second of the RF filters.

According to some embodiments, the RF device may include a radio connector that is coupled to the feed board. The radio connector may include a stepped-impedance conductor having multiple diameters. The RF device may include a low-pass filter that has a metal trace that is on the feed board and coupled to the radio connector. Moreover, the feed board may have an opening therein that is spaced apart from the radio connector.

An RF device, according to some embodiments, may include a PCB having a plurality of in-line resonators of a plurality of RF filters of a filter bank. Moreover, the RF device may include a feed board that covers and is coupled to the PCB.

In some embodiments, a first and a second of the in-line resonators of a first of the RF filters may include first and second resonator stalks, respectively, and first and second resonator heads, respectively, that extend from the first and second resonator stalks, respectively. Moreover, the PCB may include a metalized opening that is between and coupled to the first and second resonator heads.

According to some embodiments, the PCB may include an opening that is between the first and second resonator stalks and is wider than the metalized opening. Moreover, the filter bank may include a conductive housing that has an inner wall that is between the first of the RF filters and a second of the RF filters. The inner wall may be between the feed board and the PCB.

In some embodiments, each of the in-line resonators may include a first metal layer on a first surface of the PCB and a second metal layer on a second surface of the PCB that is opposite the first surface.

An RF device, according to some embodiments, may include a PCB having a plurality of RF filters that each include first and second rows of PCB resonators. Each of the PCB resonators of the first row of a first of the RF filters may be opposite and coupled to two of the PCB resonators of the second row of the first of the RF filters. Each of the PCB resonators of the first row of a second of the RF filters may be opposite and coupled to two of the PCB resonators of the second row of the second of the RF filters. Moreover, the RF device may include a feed board that covers and is coupled to the PCB.

In some embodiments, the PCB may have a metal perimeter around the PCB resonators of the first of the RF filters. The PCB resonators of the first row of the first of the RF filters may extend from a first portion of the metal perimeter. The PCB resonators of the second row of the first of the RF filters may extend from a second portion of the metal perimeter that is opposite the first portion. Moreover, the RF device may include a conductive housing that has an inner wall that is between the first of the RF filters and the second of the RF filters, and the inner wall may be between the feed board and the PCB.

According to some embodiments, each of the PCB resonators may include a first metal layer on a first surface of the PCB and a second metal layer on a second surface of the PCB that is opposite the first surface.

BRIEF DESCRIPTION OF THE DRAWINGS

FIG. 2O is a schematic side view of the feed board of FIG. 2K with radiating elements thereon.

DETAILED DESCRIPTION OF THE INVENTION

Pursuant to embodiments of the present invention, RF devices are provided that increase integration between a cellular base station antenna and RF filters that are coupled between a radio and radiating elements of the antenna. Such integration may be desirable in the case of, for example, a massive multi-input-multi-output ("MIMO") antenna, for which it may be advantageous to reduce size (e.g., dimensions and/or weight) and cost.

In some embodiments, a filter bank and a feed board may be a single, integrated component rather than separate components. For example, resonators of the filter bank may be covered by a ground plane that is on the rear surface (i.e., back side) of the feed board, and the filter bank may thereby use the ground plane of the feed board as a conductive wall of the filter bank. A plurality of radiating elements may extend forward from a front surface of the feed board that is opposite the rear surface. The integrated filter bank and feed board may help to reduce the dimensions, weight, and/or cost of a cellular base station antenna while providing good thermal compensation and RF performance.

Example embodiments of the present invention will be described in greater detail with reference to the attached figures.

Figure 1A:
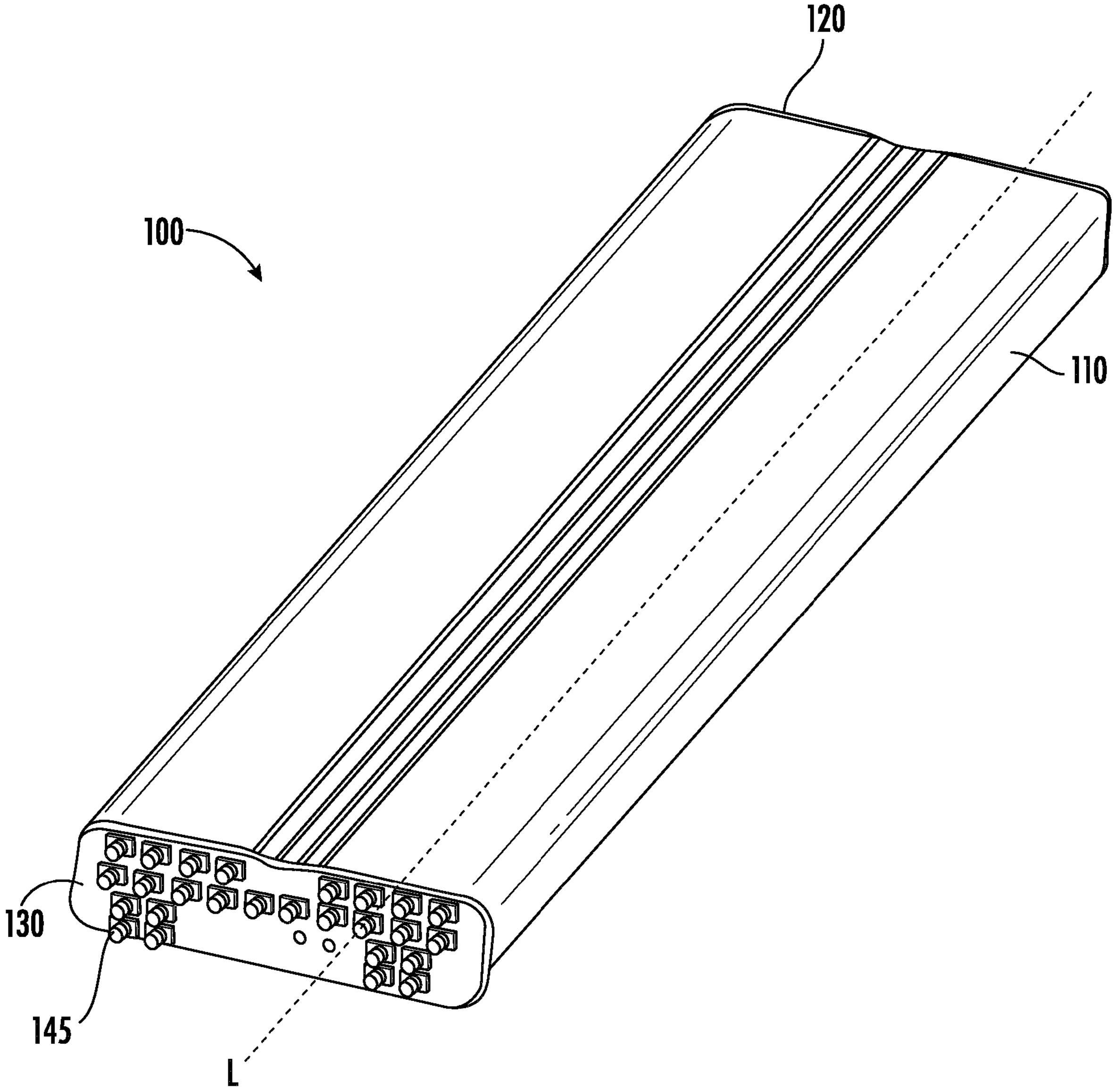
FIG. 1A is a front perspective view of a base station antenna, according to embodiments of the present invention.

FIG. 1A is a front perspective view of a base station antenna 100, according to embodiments of the present invention. The antenna 100 may be, for example, a cellular base station antenna at a macrocell base station or at a small cell base station. As shown in FIG. 1A, the antenna 100 is an elongated structure and has a generally rectangular shape. The antenna 100 includes a radome 110. In some embodiments, the antenna 100 further includes a top end cap 120 and/or a bottom end cap 130. The bottom end cap 130 may include a plurality of RF connectors 145 mounted therein. The connectors 145, which may also be referred to herein as "ports," are not limited, however, to being located on the bottom end cap 130. Rather, one or more of the connectors 145 may be provided on, for example, the rear (i.e., back) side of the radome 110 that is opposite the front side of the radome 110. The antenna 100 is typically mounted in a vertical configuration (i.e., the long side of the antenna 100 extends along a vertical axis L with respect to Earth).

Figure 1B:
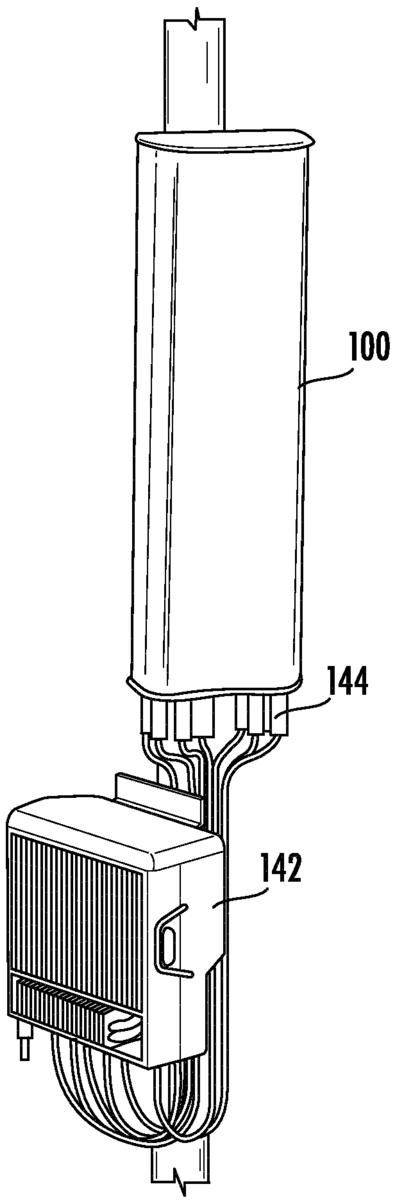
FIG. 1B is a front perspective view of the base station antenna of FIG. 1A electrically connected to a radio.

FIG. 1B is a front perspective view of the base station antenna 100 electrically connected to a radio 142 by RF transmission lines 144, such as coaxial cables. For example, the radio 142 may be a cellular base station radio, and the antenna 100 and the radio 142 may be located at (e.g., may be components of) a cellular base station. In some cases, the radio 142 may be mounted on the back surface of the antenna 100 rather than below the antenna 100.

Figure 1C:
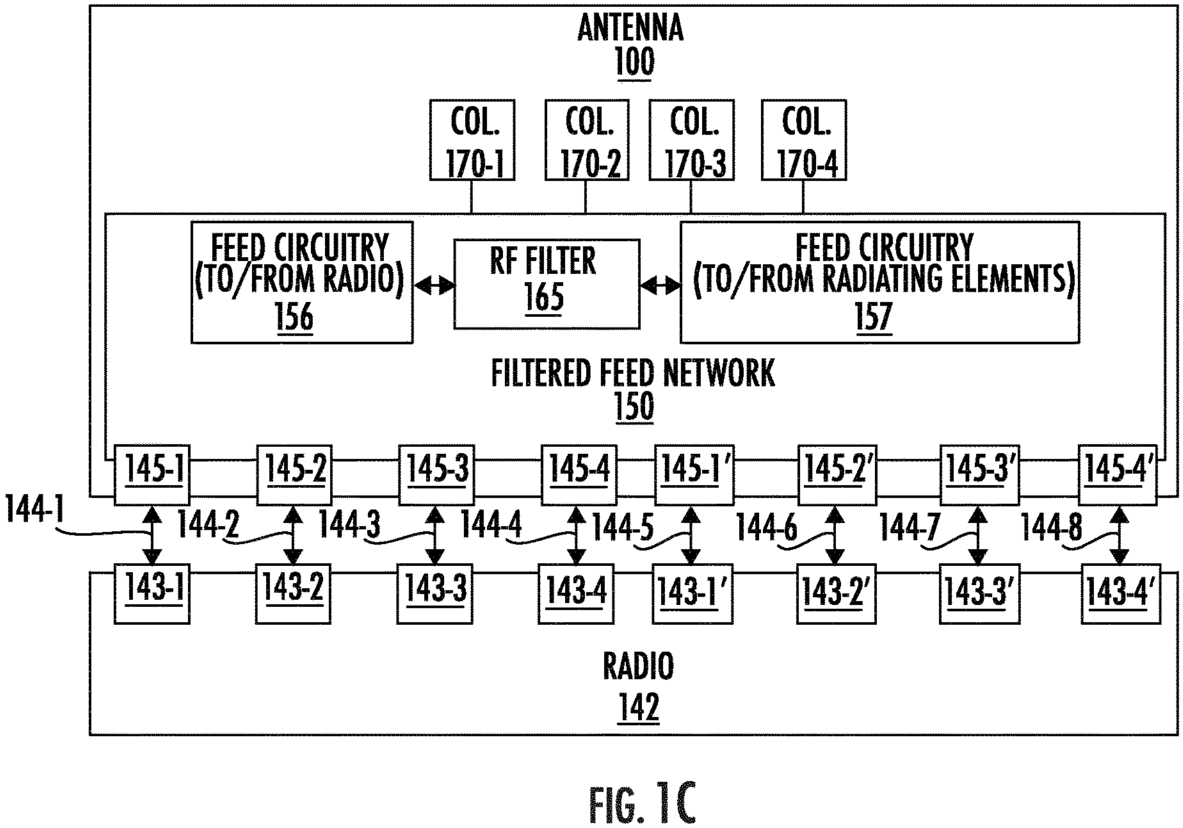
FIG. 1C is a schematic block diagram of ports of the base station antenna of FIG. 1A electrically connected to ports of the radio of FIG. 1B.

FIG. 1C is a schematic block diagram of ports 145-1, 145-2, 145-3, 145-4, 145-1', 145-2', 145-3' and 145-4' of the base station antenna 100 electrically connected to respective ports 143-1, 143-2, 143-3, 143-4, 143-1', 143-2', 143-3' and 143-4' of the radio 142. As shown in FIG. 1C, ports 145-1, 145-2, 145-3 and 145-4 of the antenna 100 are electrically connected to ports 143-1, 143-2, 143-3 and 143-4, respectively, of the radio 142 by respective RF transmission lines 144-1, 144-2, 144-3 and 144-4, such as coaxial cables. Similarly, ports 145-1', 145-2', 145-3' and 145-4' of the antenna 100 are electrically connected to ports 143-1', 143-2', 143-3' and 143-4', respectively, of the radio 142 by respective RF transmission lines 144-5, 144-6, 144-7 and 144-8. The ports 145-1, 145-2, 145-3 and 145-4 may transmit and/or receive RF signals in the same frequency band as the ports 145-1', 145-2', 145-3' and 145-4', or in a different frequency band from the ports 145-1', 145-2', 145-3' and 145-4'. For simplicity of illustration, only eight ports 145-1, 145-2, 145-3, 145-4, 145-1', 145-2', 145-3' and 145-4' are shown in FIG. 1C. In some embodiments, however, the antenna 100 may include twelve, twenty, thirty, or more ports 145, where "145" represents the collective plurality of ports. Moreover, though all of the ports 143-1, 143-2, 143-3, 143-4, 143-1', 143-2', 143-3' and 143-4' are shown as being part of a single radio 142, it will be appreciated that the ports 143-1, 143-2, 143-3, 143-4, 143-1', 143-2', 143-3' and 143-4' may alternatively be spread across multiple radios 142.

The antenna 100 may transmit and/or receive RF signals in one or more frequency bands, such as one or more bands comprising frequencies between 3.4 gigahertz ("GHz") and 3.8 GHz. For example, the antenna 100 may, in some embodiments, transmit and/or receive RF signals in all or a portion of the band(s), while rejecting RF signals outside of the band(s).

The antenna 100 may include arrays (e.g., vertical columns) 170-1, 170-2, 170-3 and 170-4 of radiating elements RE (FIG. 2O) that are configured to transmit and/or receive RF signals. The antenna 100 may also include a filtered feed network 150 that is coupled between the arrays 170-1, 170-2, 170-3 and 170-4 and the radio 142. For example, the arrays 170-1, 170-2, 170-3 and 170-4 may be coupled to respective RF transmission paths (e.g., including one or more RF transmission lines) of the feed network 150.

The arrays 170-1, 170-2, 170-3 and 170-4 may be spaced apart from each other in a horizontal direction Y (FIGS. 2A and 2O) and may each extend in a vertical direction X (FIG. 2A) from a lower portion of an antenna assembly to an upper portion of the antenna assembly. The direction X may be, or may be parallel with, the longitudinal axis L (FIG. 1A). The direction X may also be perpendicular to the direction Y and a forward direction Z. As used herein, the term "vertical" does not necessarily require that something is exactly vertical (e.g., the antenna 100 may have a small mechanical down-tilt).

The arrays 170-1, 170-2, 170-3 and 170-4 are each configured to transmit and/or receive RF signals in one or more frequency bands, such as one or more bands comprising frequencies between 3.4 GHz and 3.8 GHz. Though FIG. 1C illustrates four arrays 170-1, 170-2, 170-3 and 170-4, the antenna assembly may include more (e.g., five, six, or more) or fewer (e.g., three, two, or one) arrays 170, where "170" represents the collective plurality of arrays. Moreover, the number of radiating elements RE in a given one of the arrays 170 can be any quantity from two to twenty or more. For example, the four arrays 170-1, 170-2, 170-3 and 170-4 shown in FIG. 1C may each have three to twenty radiating elements RE. According to some embodiments, the arrays 170 may each have the same number (e.g., eight) of radiating elements RE.

In some embodiments, the feed network 150 may include one or more RF filter devices 165. Feed circuitry 156 of the feed network 150 may be coupled between each filter device 165 and the radio 142. The feed network 150 may also include feed circuitry 157 that is coupled between the filter device(s) 165 and the arrays 170. The circuitry 156/157 can couple downlink RF signals from the radio 142 to radiating elements RE that are in arrays 170. The circuitry 156/157 may also couple uplink RF signals from radiating elements RE that are in arrays 170 to the radio 142. For example, the circuitry 156/157 may include power dividers, RF switches, RF couplers, and/or RF transmission lines that couple the filter device(s) 165 between the radio 142 and the arrays 170.

Moreover, the antenna 100 may include phase shifters that are used to electronically adjust the tilt angle of the antenna beams generated by each array 170. The phase shifters may be located at any appropriate location along the RF transmission paths that extend between the ports 145-1, 145-2, 145-3, 145-4, 145-1', 145-2', 145-3' and 145-4' and the arrays 170-1, 170-2, 170-3 and 170-4. Accordingly, though omitted from view in FIG. 1C for simplicity of illustration, the feed network 150 may include phase shifters.

Figure 2A:
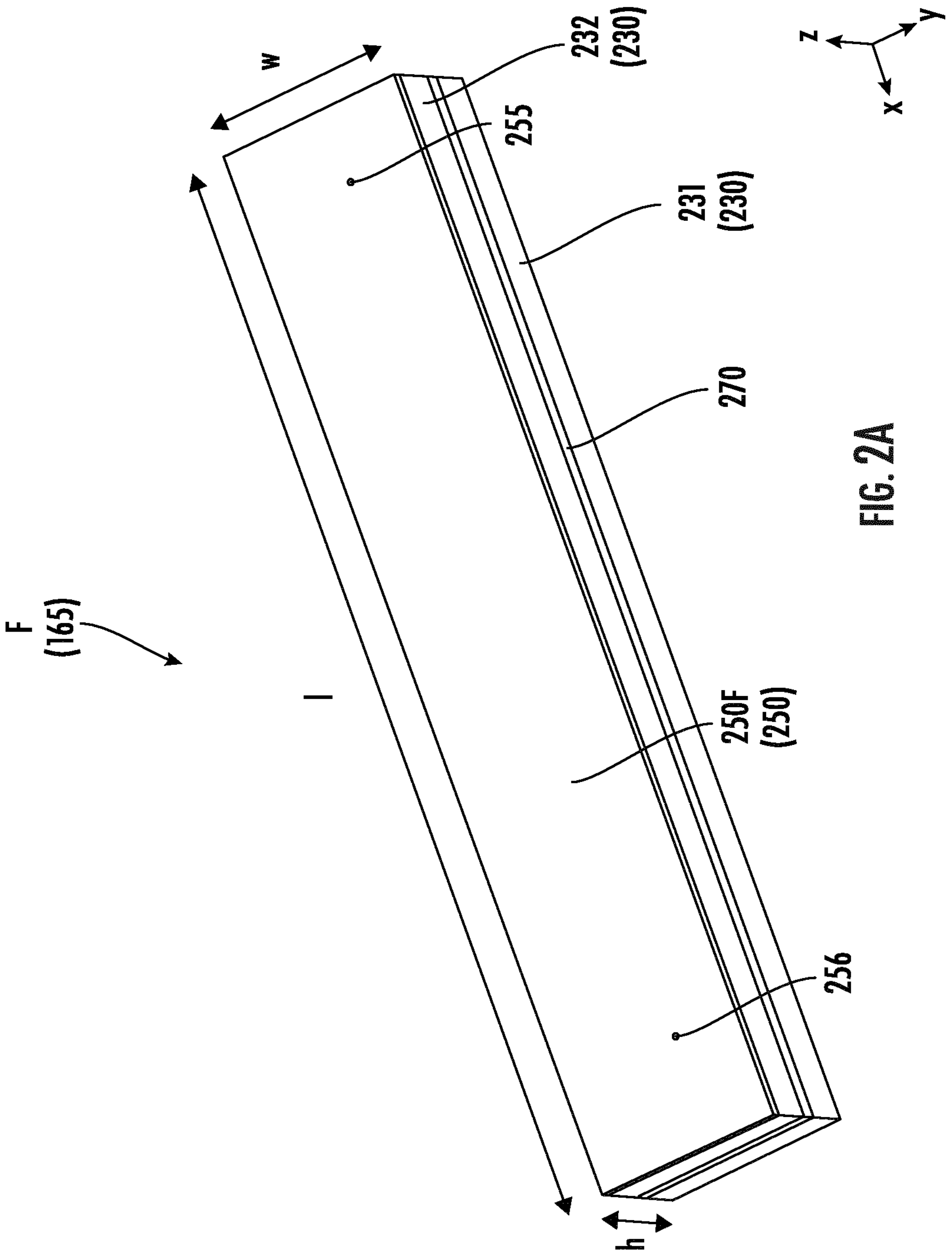
FIG. 2A is a front perspective view of an RF filter of the filter device of FIG. 1C, according to embodiments of the present invention.

FIG. 2A is a front perspective view of an RF filter F of a filter device 165, according to embodiments of the present invention. The filter F includes a conductive housing 230 and a plurality of resonators R (FIG. 2B) that are each part of a single (i.e., monolithic) flat piece 270 that is between two metal shells 231, 232 of the housing 230. The housing 230 may also be referred to herein as a "filter chassis" or an "outer frame," and the flat piece 270 may also be referred to herein as an "inner frame." A front of the filter chassis 230 is covered by a feed board 250. For simplicity of illustration, radiating elements RE (FIG. 2O) that project forward from a front surface 250F of the feed board 250 are omitted from view in FIG. 2A.

Input/output nodes 255, 256 of the filter F may be on the feed board 250. For example, the flat piece 270 of the filter F may be coupled to the radiating elements RE via the node 256, and the flat piece 270 may be coupled to the radio 142 (FIG. 1C) via the node 255.

The filter F may have a height h of less than 15 millimeters ("mm") in the direction Z, a length 1 of less than 115 mm in the direction X, and a width w of about 20 mm in the direction Y. According to some embodiments, however, a low-pass filter may be included in the device 165, which may extend the length 1 beyond 115 mm. Moreover, a distance in the direction Y between the input/output nodes 255, 256 of one filter F and those of an adjacent filter F may be equal to the width w.

Figure 2B:
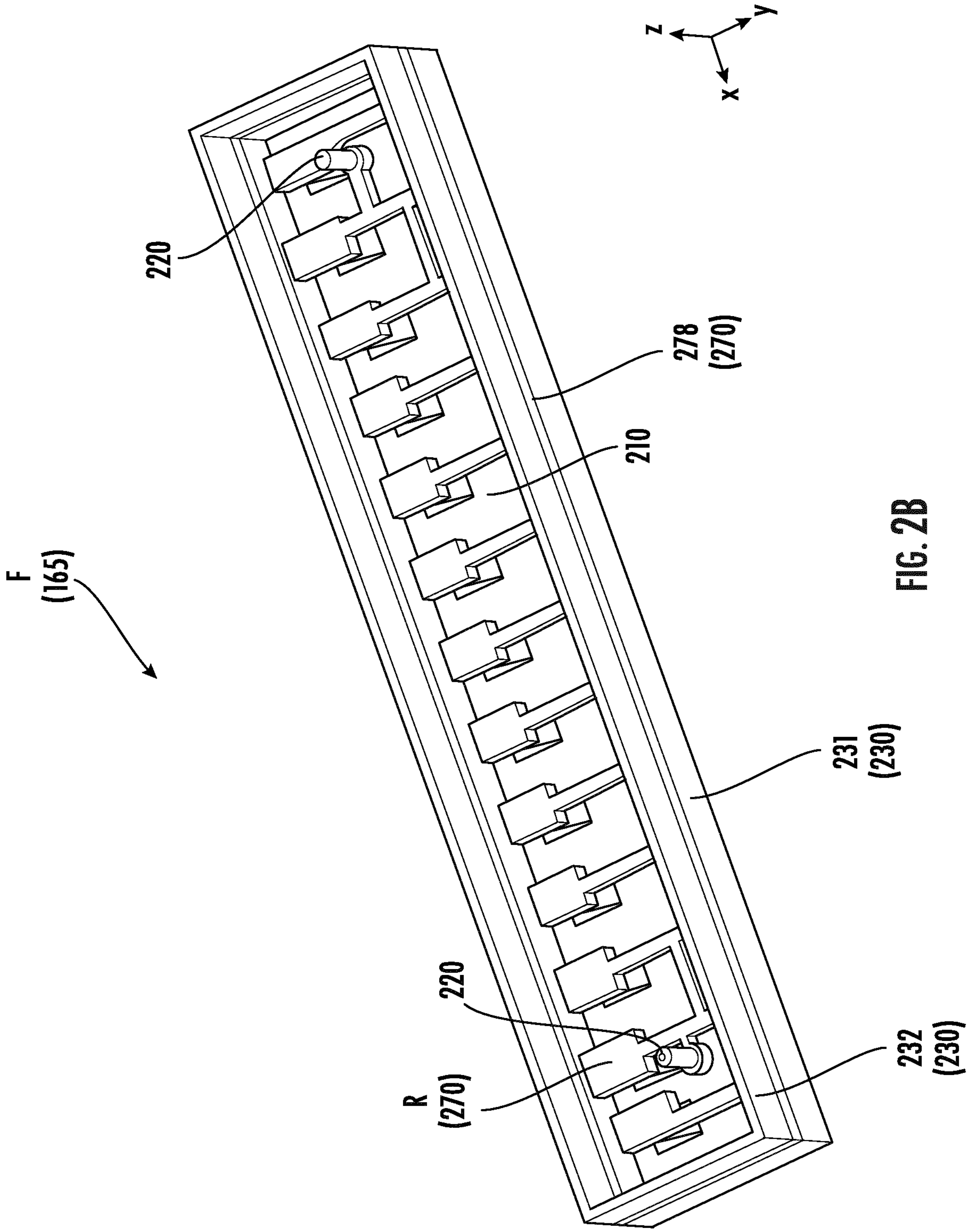
FIG. 2B is a front perspective view of the RF filter of FIG. 2A with the feed board removed.

FIG. 2B is a front perspective view of the RF filter F of FIG. 2A with the feed board 250 removed. As shown in FIG. 2B, the flat piece 270 includes a plurality of resonators R. As an example, the flat piece 270 may include eleven in-line resonators R that are coupled between two RF input/output connectors 220. One of the two connectors 220 may comprise, for example, a first conductive pin that couples the in-line resonators R to radiating elements RE (FIG. 2O) via the input/output node 256 on the feed board 250 as shown in FIG. 2A, and the other of the two connectors 220 may comprise a second conductive pin that couples the in-line resonators R to the radio 142 (FIG. 1C) via the input/output node 255 on the feed board 250. In some embodiments, the flat piece 270 may also include two outermost resonators that are not coupled between the two connectors 220.

The filter device 165 includes a tuning cover 210 that covers a rear of the filter chassis 230. The cover 210 may be a conductive cover that is configured to tune resonance frequencies and couplings between resonators R of the flat piece 270. The cover 210 rests on the bottom of the shell 231 of the conductive housing 230. The two shells 231, 232 of the housing 230 provide conductive walls that define a cavity in which the resonators R are configured to resonate. In some embodiments, the flat piece 270 may be soldered to both of the shells 231, 232. For example, a perimeter 278 of the flat piece 270 may have front and rear sides that are soldered to the shell 232 and the shell 231, respectively.

Figure 2C:
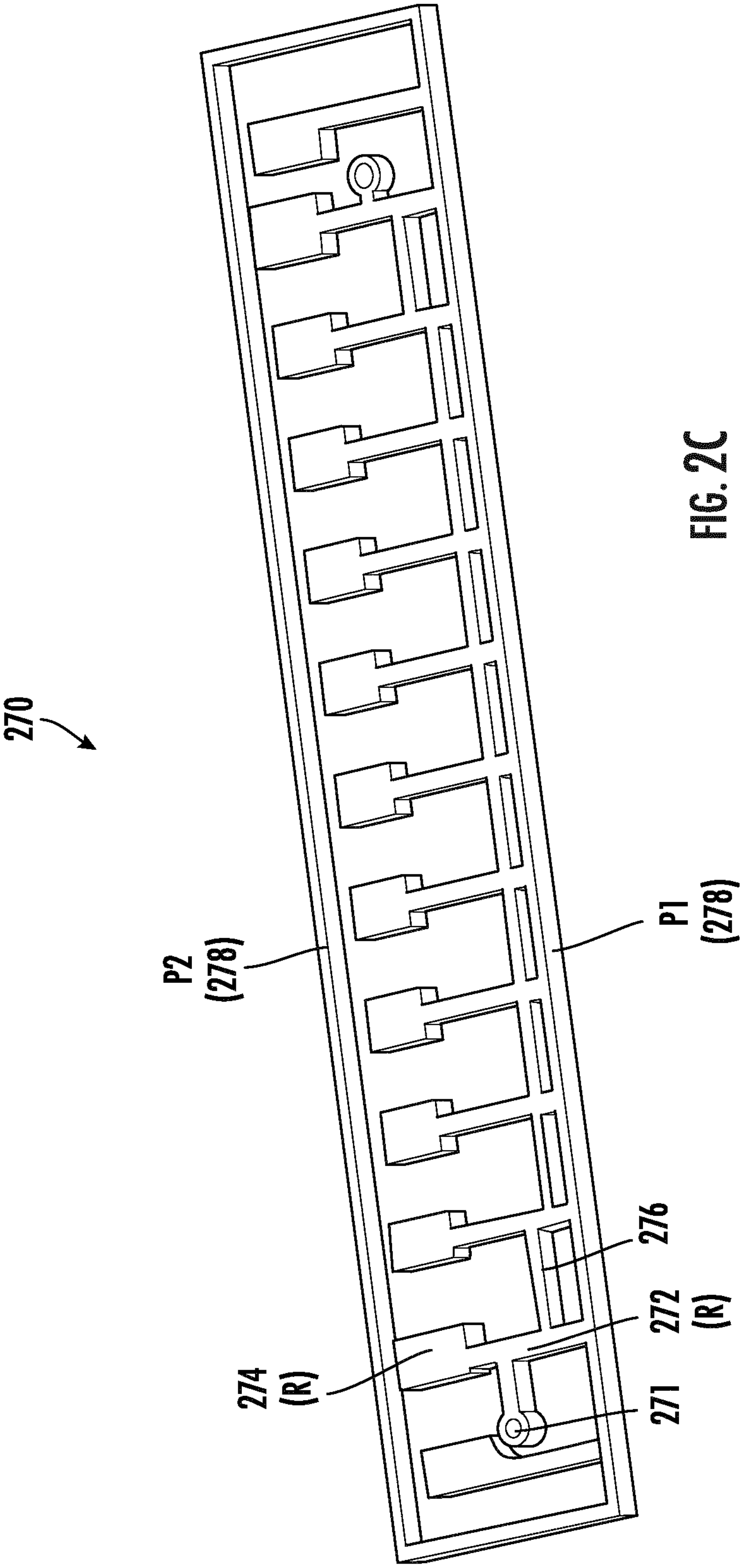
FIG. 2C is a rear perspective view of the resonators of FIG. 2B.

FIG. 2C is a rear perspective view of the resonators R of FIG. 2B. As shown in FIG. 2C, each resonator R may include a resonator stalk 272 and a resonator head 274 that extends from the stalk 272. The stalks 272 may all extend from a first portion P1 of a perimeter 278 of the flat piece 270. The first portion P1 may be opposite a second portion P2 of the perimeter 278 that is adjacent, and spaced apart from, the heads 274.

Adjacent stalks 272 of the eleven in-line resonators R may be physically connected to each other by linking portions 276 of the flat piece 270. The two outermost resonators, on the other hand, may not be physically connected to any linking portion 276. Moreover, two loops 271 in the flat piece 270 may extend from stalks 272 of the two outermost ones of the eleven in-line resonators R, respectively. Each loop 271 may be configured to receive a connector 220 (FIG. 2B), and may approach a respective one of the outermost resonators to provide desired capacitive coupling.

The flat piece 270 may be formed in various ways. For example, the flat piece 270 may be (i) die cast, (ii) made of machined sheet metal, (iii) stamped, (iv) made of injection-molded plastic that is covered with metal plating, (v) or made by injecting metal powder. Moreover, the flat piece 270 may comprise steel, which can provide better temperature compensation than other conductive materials. For example, steel may expand and/or contract less than aluminum.

According to some embodiments, the flat piece 270 may be about 2 mm thick in the direction Z (FIG. 2B). As an example, to ensure good RF performance, including strong capacitance with a filter wall (e.g., a wall of the housing 230 (FIG. 2B)) and strong coupling between adjacent heads 274, the thickness may be no smaller than 1.5 mm. In other embodiments, the flat piece 270 may be thinner and the heads 274 may be larger (e.g., wider) and/or bent to improve coupling with a filter wall and/or adjacent heads 274. For example, distal ends of the heads 274 of at least some of the resonators R may be bent at angles of about 90 degrees to form plate capacitors with the second portion P2 of the perimeter 278.

Figure 2D:
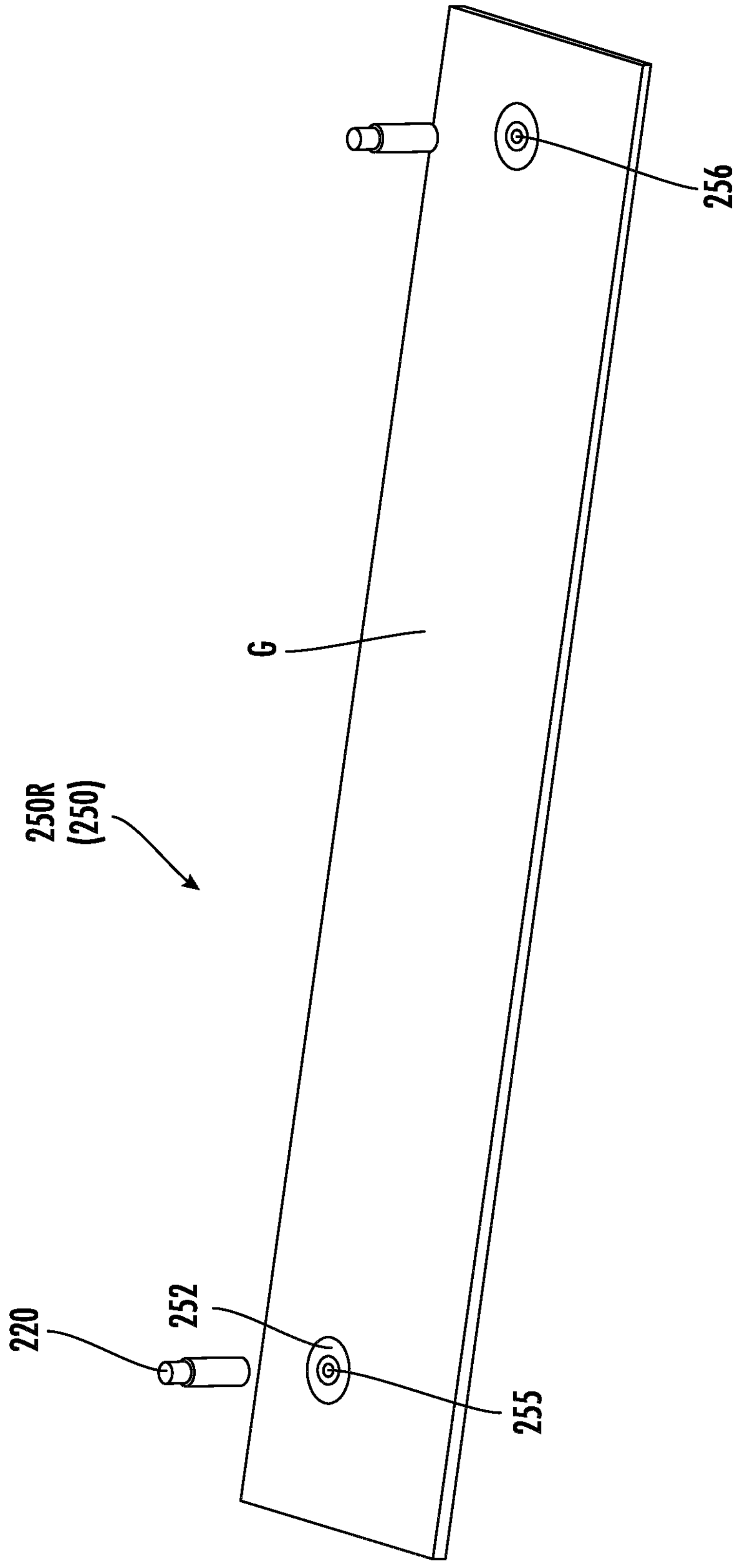
FIG. 2D is a rear perspective view of the feed board of FIG. 2A.

FIG. 2D is a rear perspective view of the feed board 250 of FIG. 2A. For simplicity of illustration, the connectors 220 are shown floating adjacent a rear surface 250R of the feed board 250. The connectors 220, however, may be physically connected (e.g., soldered) to respective input/output nodes 255, 256, which may comprise metallized through holes in a dielectric substrate 252 of the feed board 250. A ground plane G may be on the rear surface 250R of the feed board 250 and may be electrically isolated from the connectors 220 by annular regions on the dielectric substrate 252 where no metallization is provided. When the feed board 250 is attached to the housing 230 (FIG. 2A), the ground plane G may be opposite (e.g., may face, cover, and be spaced apart from) a front surface of the flat piece 270 (FIG. 2B). The ground plane G may comprise, for example, copper, and may be soldered to the housing 230.

Figure 2E:
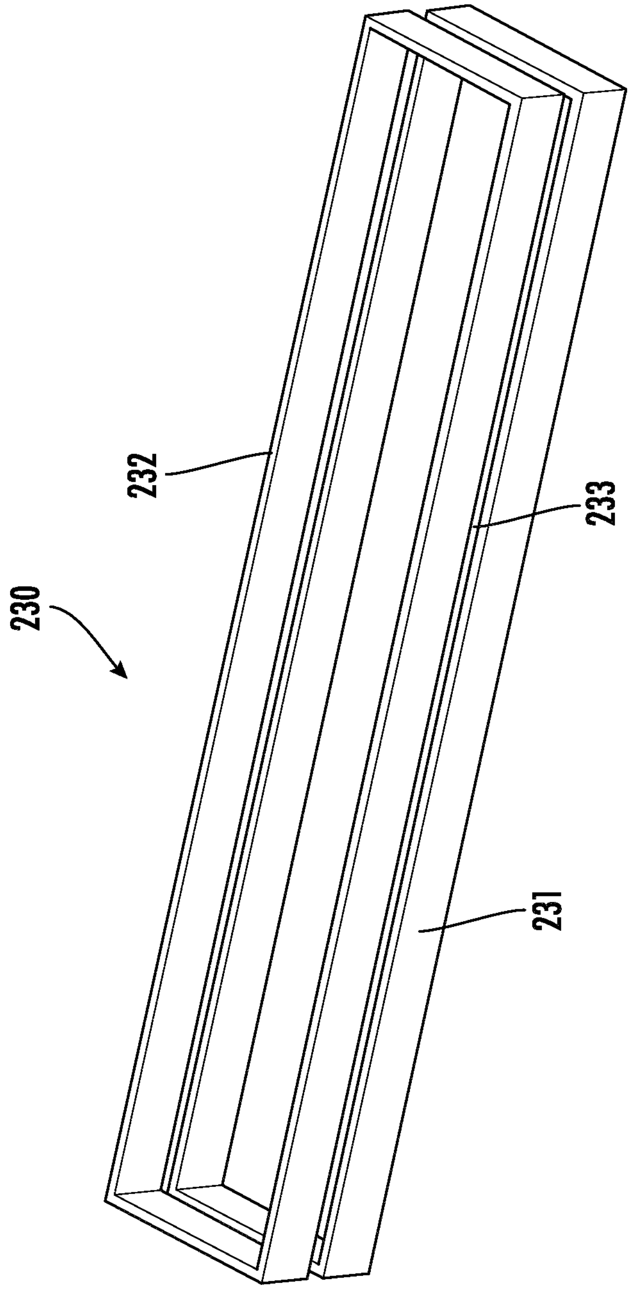
FIG. 2E is a front perspective view of the conductive housing of FIG. 2A.

FIG. 2E is a front perspective view of the conductive housing 230 of FIG. 2A. As shown in FIG. 2E, the housing 230 has a gap 233 between metal shells 231, 232. The gap 233 is configured to receive the flat piece 270 (FIG. 2C). For example, the gap 233 may be configured to receive the perimeter 278 (FIG. 2C) of the flat piece 270. Moreover, the metal shells 231, 232 may be formed in various ways, such as by diecasting or by extrusion and cutting. In some embodiments, the shells 231, 232 may be formed by three-dimensional ("3D") printing.

Figure 2F:
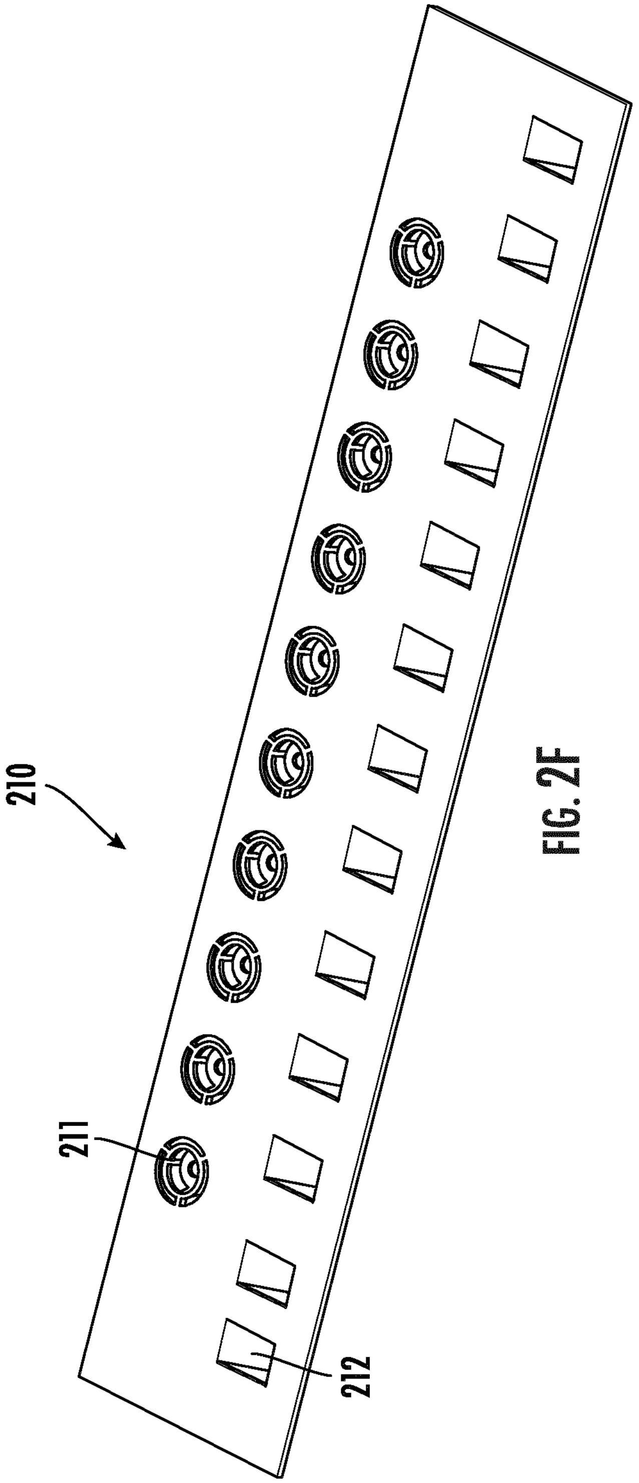
FIG. 2F is a rear perspective view of the tuning cover of FIG. 2B.

FIG. 2F is a rear perspective view of the tuning cover 210 of FIG. 2B. The cover 210 may comprise a variety of tuning elements. For example, the cover 210 may comprise a first row of tuning elements 211 between, in the direction X (FIG. 2B), stalks 272 (FIG. 2C) of the resonators R (FIG. 2B), and a second row of tuning elements 212 overlapping, in the direction Z (FIG. 2B), heads 274 (FIG. 2C) of the resonators R.

The tuning elements 212 may be arranged/aligned with each other in the direction X and may have a shape that is different from a shape of the tuning elements 211 in some embodiments. As an example, the tuning elements 212 may be respective tabs that are bent/punched from a main surface of the cover 210. The tabs may project/slope toward respective heads 274. The tuning elements 211, on the other hand, may comprise respective twistable tuning elements with circular/loop regions (e.g., of cap/basket shapes).

Figure 2G:
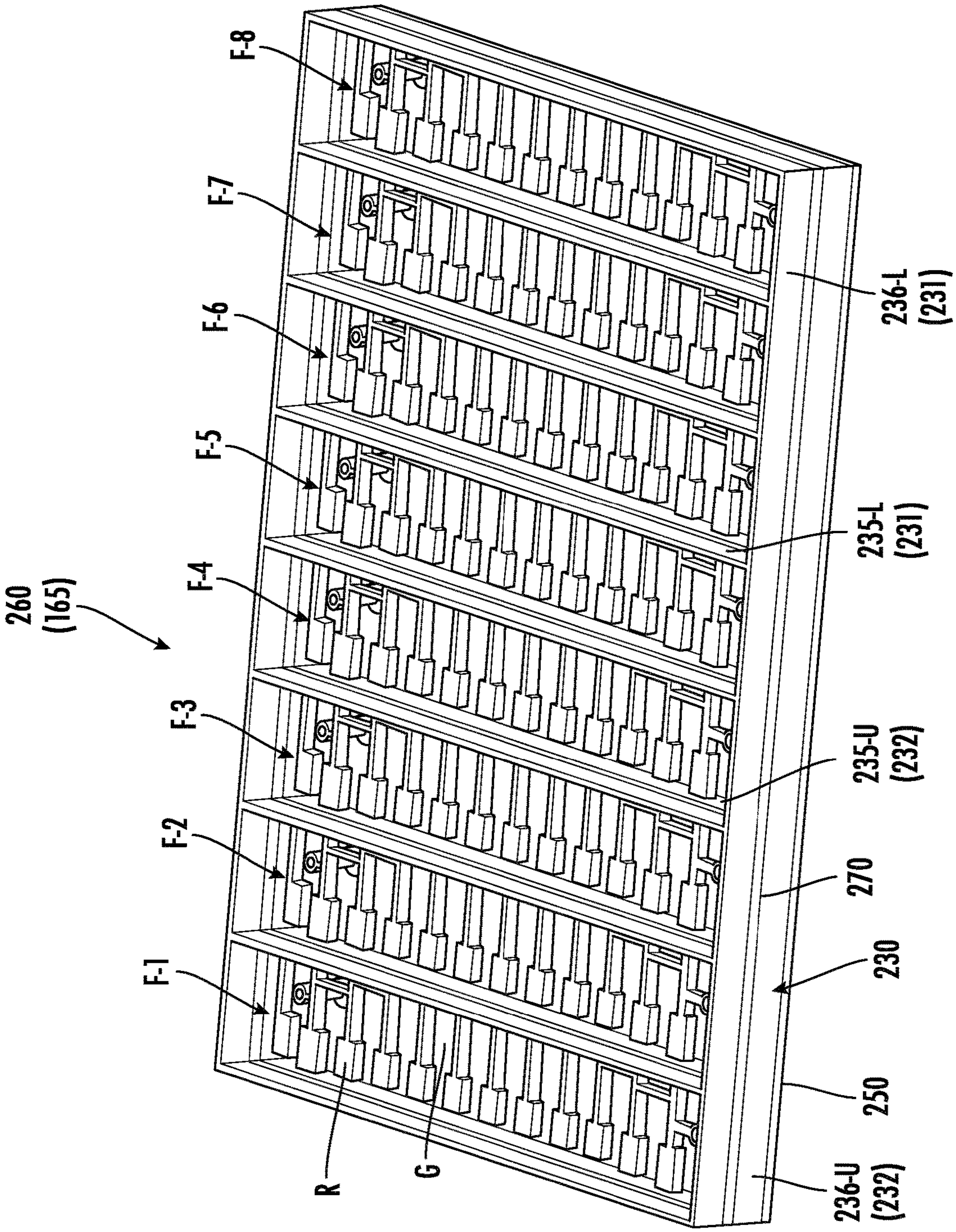
FIGS. 2G, 2H and 2I are rear perspective views of different examples of an RF filter bank of the filter device of FIG. 1C with the tuning cover removed, according to embodiments of the present invention.
Figure 2H:
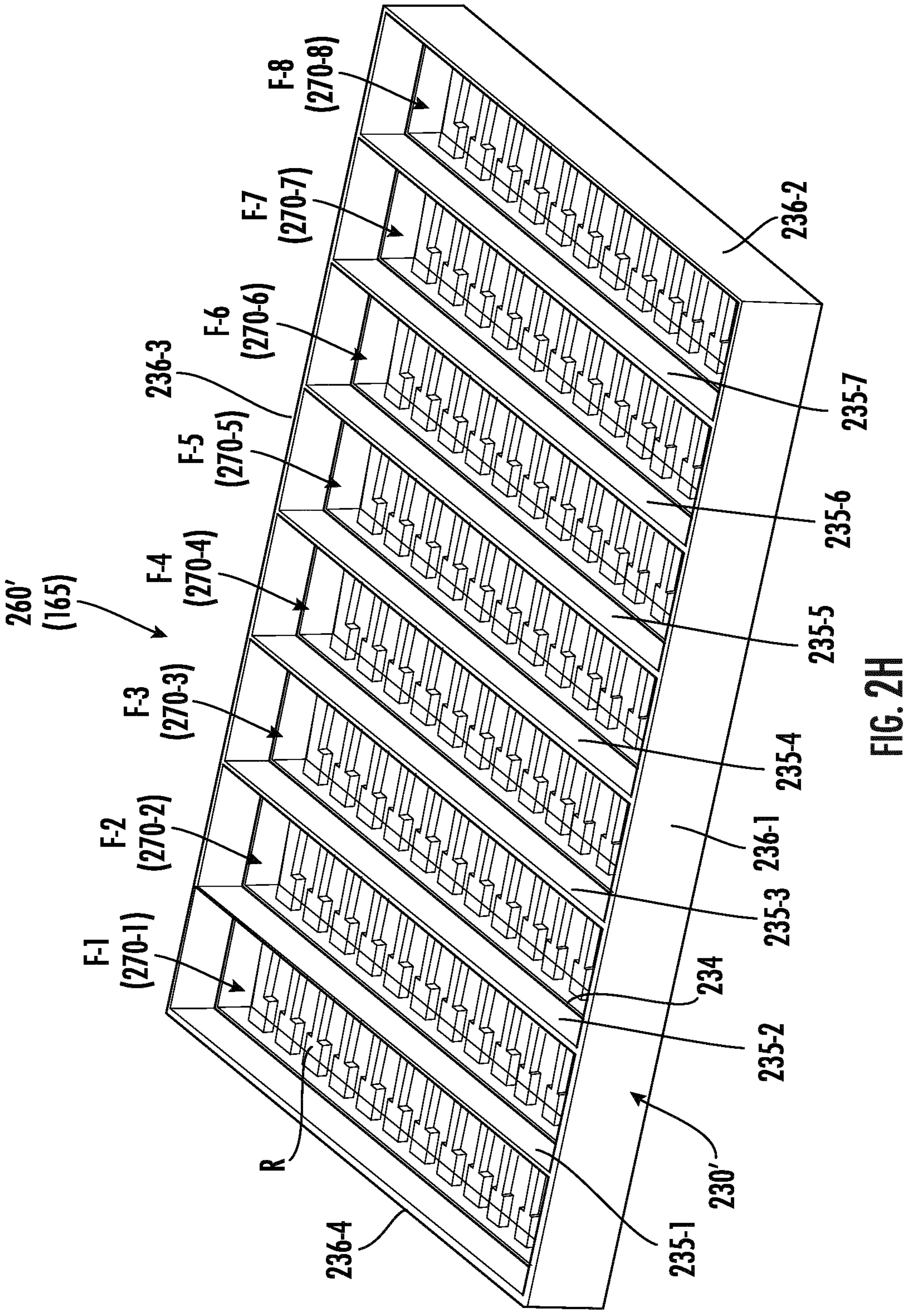
Figure 2I:
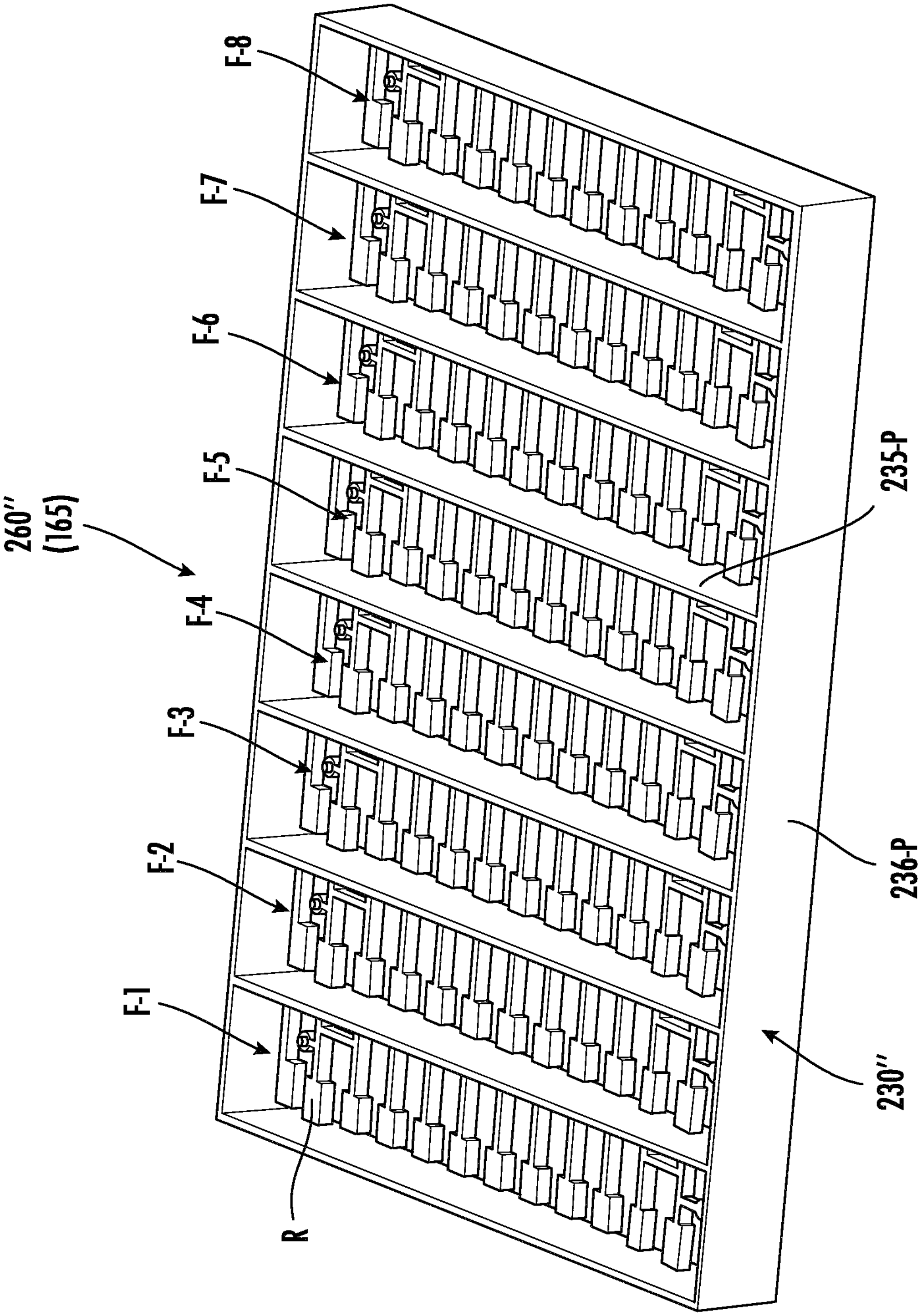

FIGS. 2G, 2H and 2I are rear perspective views of different examples of an RF filter bank of the filter device 165 of FIG. 1C with the tuning cover 210 (FIG. 2F) removed, according to embodiments of the present invention. As used herein, the term "rear perspective view" is relative to (e.g., opposite) a view that faces the front surface 250F (FIG. 2A) of the feed board 250. Also, as used herein, the term "filter bank" refers to a group of RF filters. For example, FIGS. 2G-2I show filter banks that each include eight RF filters F-1, F-2, F-3, F-4, F-5, F-6, F-7 and F-8. The filter banks are not limited to eight RF filters F, however, and may instead have, for example, four, five, six, or seven RF filters F. In some embodiments, the antenna 100 may comprise 4-8 filter banks, each of which may include four or more filters F. According to some embodiments, the filter device 165 may comprise a plurality of filter banks. In other embodiments, the antenna 100 may comprise a plurality of filter devices 165 that comprise respective filter banks.

As shown in FIG. 2G, resonators R of eight RF filters F-1, F-2, F-3, F-4, F-5, F-6, F-7 and F-8 of a filter bank 260 may all be part of a single flat piece 270 that is between two metal shells 231, 232 of a conductive housing 230. The filter bank 260 may be covered by one or more feed boards 250. In some embodiments, the feed board(s) 250 may comprise feed circuitry 157 (FIG. 1C) that is coupled between the filter bank 260 and radiating elements RE (FIG. 2O) that are on an opposite side of the feed board(s) 250 from the resonators R.

The shells 231, 232 include inner conductive walls 235-L, 235-U, respectively, that extend between adjacent RF filters to electrically isolate the adjacent filters F from each other. For example, each wall 235-L may extend continuously to physically connect opposite outer conductive walls 236-L of the shell 231 to each other, and each wall 235-U may extend continuously to physically connect opposite outer conductive walls 236-U of the shell 232 to each other. Accordingly, the housing 230 may include seven walls 235-U and seven walls 235-L that electrically isolate eight RF filters F-1, F-2, F-3, F-4, F-5, F-6, F-7 and F-8 from each other. The housing 230 may also include four walls 236-U and four walls 236-L. In some embodiments, a ground plane G of a single feed board 250 may cover all eight filters F-1, F-2, F-3, F-4, F-5, F-6, F-7 and F-8 of the filter bank 260 (and/or cover more than eight filters F, such by covering multiple filter banks 260). Moreover, the filters F may be respective band-pass filters, which may be configured to pass frequencies between 3.4 GHz and 3.8 GHz in example embodiments.

A single flat piece 270 is shown in FIG. 2G. According to some embodiments, however, the filter bank 260 may comprise multiple layers of flat pieces 270. For example, the flat piece 270 shown in FIG. 2G may overlap, in the direction Z (FIG. 2B) at least one other flat piece 270.

As shown in FIG. 2H, a filter bank 260' may comprise a plurality of flat pieces 270 that each comprise a plurality of resonators R. For example, the filter bank 260' may comprise eight RF filters F-1, F-2, F-3, F-4, F-5, F-6, F-7 and F-8 having eight flat pieces 270-1, 270-2, 270-3, 270-4, 270-5, 270-6, 270-7 and 270-8, respectively. The flat pieces 270-1, 270-2, 270-3, 270-4, 270-5, 270-6, 270-7 and 270-8, which may be referred to collectively as "270," may be physically supported by ledge portions 234 of inner conductive walls 235 of a conductive housing 230'. The housing 230' may be formed in various ways, including any of those that are discussed herein with respect to the metal shells 231, 232 of the housing 230 of FIG. 2E. In some embodiments, the housing 230' may have a monolithic, rather than multi-shell, structure.

The housing 230' comprises seven inner conductive walls 235-1, 235-2, 235-3, 235-4, 235-5, 235-6 and 235-7 that each have a ledge portion 234 on at least one side thereof, as shown in FIG. 2H. As an example, the walls 235-1, 235-2 may include respective ledge portions 234 that support the flat pieces 270-2, 270-3, respectively. In some embodiments, the wall 235-1 may include a ledge portion 234 on a first side thereof that supports the flat piece 270-1 and another ledge portion 234 that is on a second side (opposite the first side) that supports the flat piece 270-2. Moreover, four outer conductive walls 236-1, 236-2, 236-3 and 236-4 may each have a ledge portion 234 on one side thereof. Each wall 235 may extend continuously to physically connect the walls 236-1 and 236-3 to each other. Accordingly, four sides of a perimeter 278 (FIG. 2C) of each flat piece 270 may, in some embodiments, be supported by (and may contact) ledge portions 234 of the housing 230'.

According to some embodiments, the filter bank 260' may comprise multiple layers of flat pieces 270, each flat piece includes a plurality of resonators R. For example, the eight flat pieces 270-1, 270-2, 270-3, 270-4, 270-5, 270-6, 270-7 and 270-8 may each overlap, in the direction Z (FIG. 2B) at least one other flat piece 270 that is supported by other ledge portions 234.

As shown in FIG. 2I, a conductive housing 230" of a filter bank 260" may have inner conductive walls 235-P and outer conductive walls 236-P that are made by injecting metallized powder. Moreover, resonators R of RF filters F of the filter bank 260" may also be made by injecting metallized powder. Accordingly, the resonators R and the housing 230" may all be part of a single (i.e., monolithic) piece. In some embodiments, the resonators R and the housing 230" may be formed of metallized injection-molded plastic instead of metallized powder. Metallized powder, however, may have better thermal-expansion properties than metallized injection-molded plastic.

For example, a body of the filter chassis 230" can be injection-molded with metallized powder rather than metallizing a further material. Powder injection molding ("PIM") is a metalworking technique in which finely-powdered metal is combined with a binder material (e.g., wax and polypropylene) to obtain a liquid raw material that is then solidified and shaped using injection molding. After the solidified/molded material is cooled and ejected, it may go through other processes (e.g., de-binding and sintering) before obtaining the final product.

According to some embodiments, the filter bank 260" may comprise multiple layers of resonators R. For example, the eight RF filters F-1, F-2, F-3, F-4, F-5, F-6, F-7 and F-8 may each have resonators R that overlap, in the direction Z (FIG. 2B), resonators R of at least one other RF filter F, where all of the resonators R are part of the same piece as the housing 230".

Figure 2J:
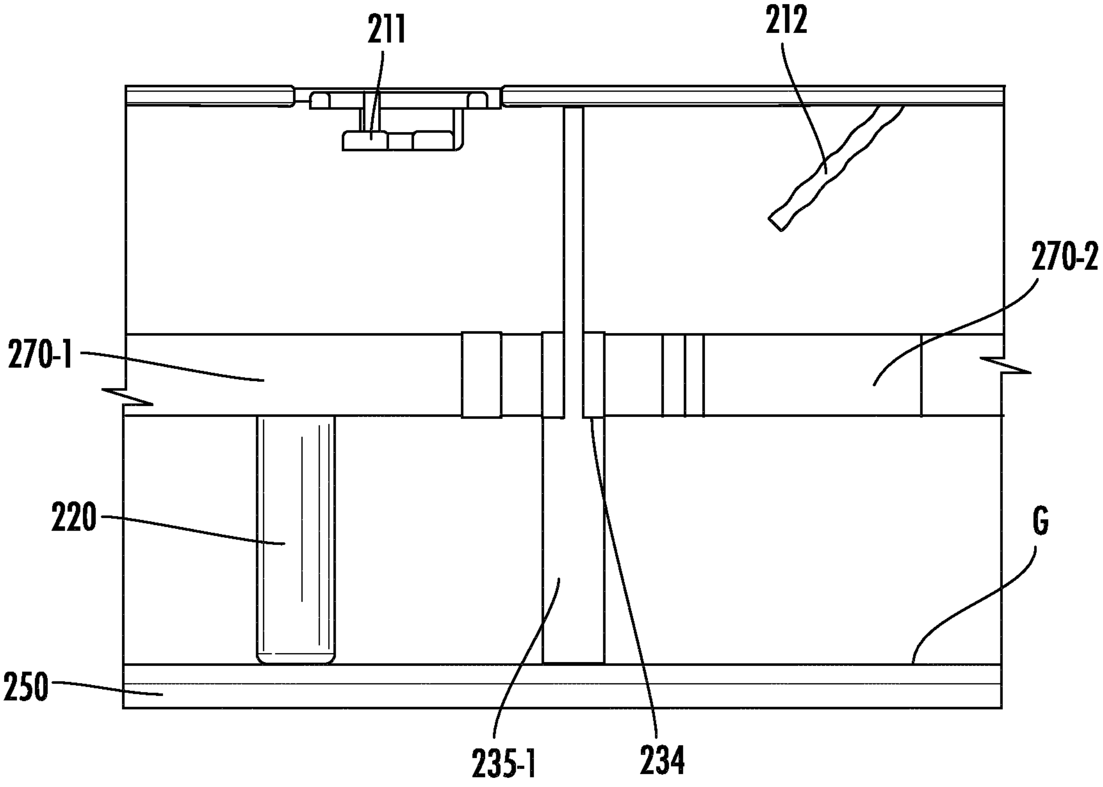
FIG. 2J is an enlarged side view of a portion of the filter bank of FIG. 2H.

FIG. 2J is an enlarged side view of a portion of the filter bank 260' of FIG. 2H. As shown in FIG. 2J, an inner conductive wall 235-1 may include, on opposite sides thereof, two ledge portions 234 that physically support first and second flat pieces 270-1, 270-2, respectively. The ledge portions 234 may be implemented by having a wider region of the wall 235-1 adjacent (and/or contacting) a ground plane G on a feed board 250, and a narrower region adjacent (and/or contacting) a tuning cover 210 (FIG. 2F). In some embodiments, the wall 235-1 may be between, in the direction Y (FIG. 2B), (a) a tuning element 211 that is between, in the direction X (FIG. 2B), stalks 272 (FIG. 2C) of adjacent resonators R (FIG. 2H) of the first flat piece 270-1 and (b) a differently-shaped tuning element 212 that overlaps, in the direction Z (FIG. 2B), a head 274 (FIG. 2C) of a resonator R of the second flat piece 270-2.

In some embodiments, the filter bank 260 (FIG. 2G), the filter bank 260' (FIG. 2H), or the filter bank 260" (FIG. 21) may be part of an RF device 200 (FIG. 2O) in which the filter bank 260/260'/260" is integrated with a feed board 250 (FIG. 2O) that both (i) feeds radiating elements RE (FIG. 2O) and (ii) provides a ground plane G (FIG. 2D) that covers resonators R of the filter bank 260/260'/260". The filter devices 165 (including the filter banks 260, 260', 260" thereof) that are shown in FIGS. 2G, 2H and 2I thus may be implemented as one side of the device 200 rather than implemented as dedicated filter devices that are separate from the feed board 250, and the radiating elements RE may be implemented on an opposite side of the device 200 (e.g., an opposite side of the feed board 250).

Figure 2K:
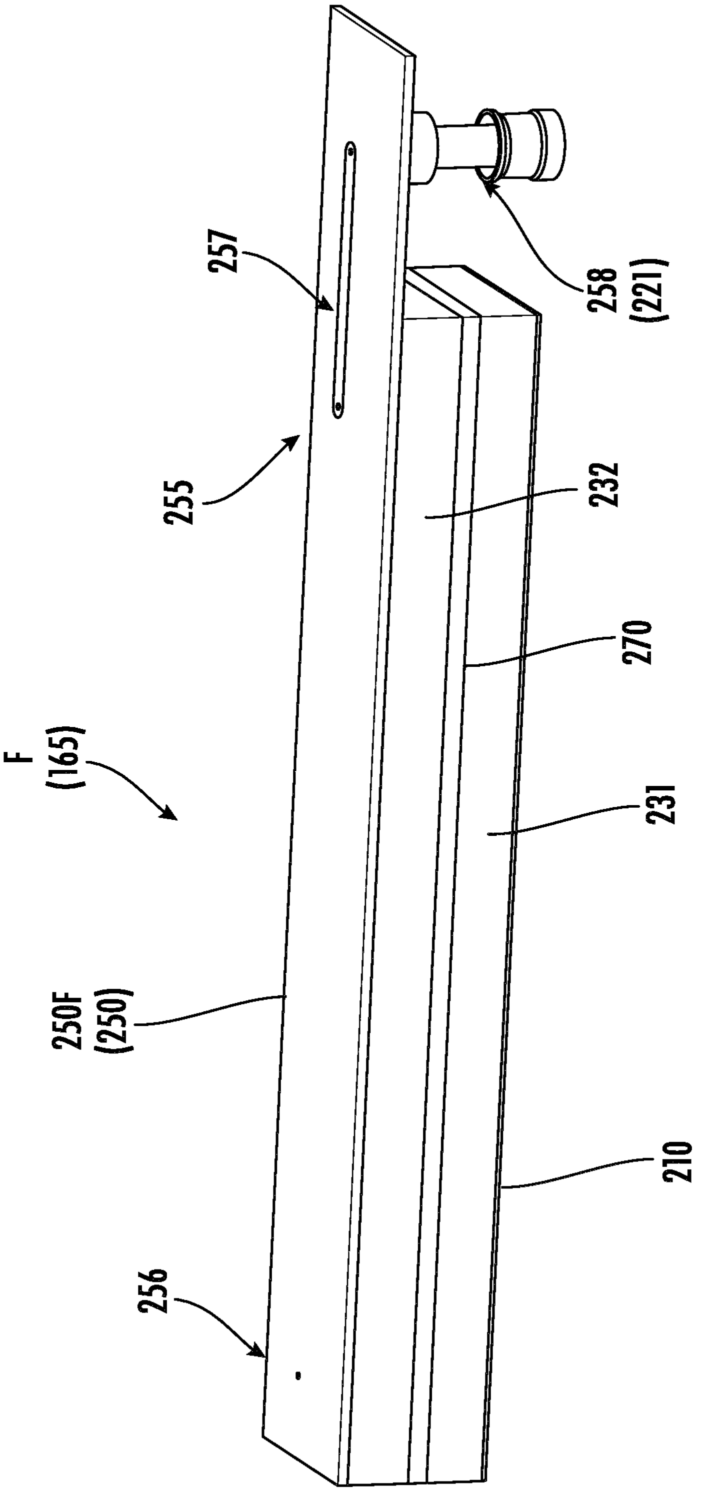
FIG. 2K is a side perspective view of an RF filter of the filter device of FIG. 1C, according to further embodiments of the present invention.

FIG. 2K is a side perspective view of an RF filter F of the filter device 165 of FIG. 1C, according to further embodiments of the present invention. The filter device 165 includes a plurality of RF connectors 221 that are coupled to the radio 142 (FIG. 1C) and may be referred to herein as "radio connectors." For example, each filter F of the filter bank 260 (FIG. 2G) may be coupled to the radio 142 via a respective connector 221. For simplicity of illustration, however, only one filter F (and thus one connector 221) is shown in FIG. 2K.

As shown in FIG. 2K, a connector 221 may be outside of a perimeter of the metal shells 231, 232. As an example, the connector 221 may project in the direction Z (FIG. 2A) from a portion of the rear surface 250R (FIG. 2D) of the feed board 250 that is outside of the shells 231, 232. An RF transmission line 257 (e.g., a 50-ohm metal trace) on the front surface 250F of the feed board 250 may couple the connector 221 to the input/output node 255, which is coupled to a connector 220 (FIG. 2B) that is inside the shell 232 and coupled to the flat piece 270. In other embodiments, the connector 221 may be inside the shells 231, 232.

For simplicity of illustration, the filter device 165 is shown in FIG. 2K as having the two shells 231, 232. According to some embodiments, however, connectors 221 may be implemented with a filter device 165 that has a conductive housing 230' or 230" (FIGS. 2H and 2I, respectively) without multiple shells 231, 232. Connectors 221 can thus be inside or outside of cavities provided by metal walls 235, 236 (FIGS. 2H and 2I, respectively) of the conductive housing 230' or 230".

In some embodiments, connectors 221 may be coupled to the radio 142 via the connectors 145-1, 145-2, 145-3, 145-4, 145-1', 145-2', 145-3' and 145-4' (FIG. 1C) of the antenna 100. The connectors 221 may be one of various types of RF connectors, such as pin-type connectors, bullet-type connectors, or SMP-MAX connectors. For example, FIG. 2K shows a connector 221 that is a bullet-type connector 258 having part of its outer conductor removed to illustrate an interior portion of the connector 258.

Figure 2L:
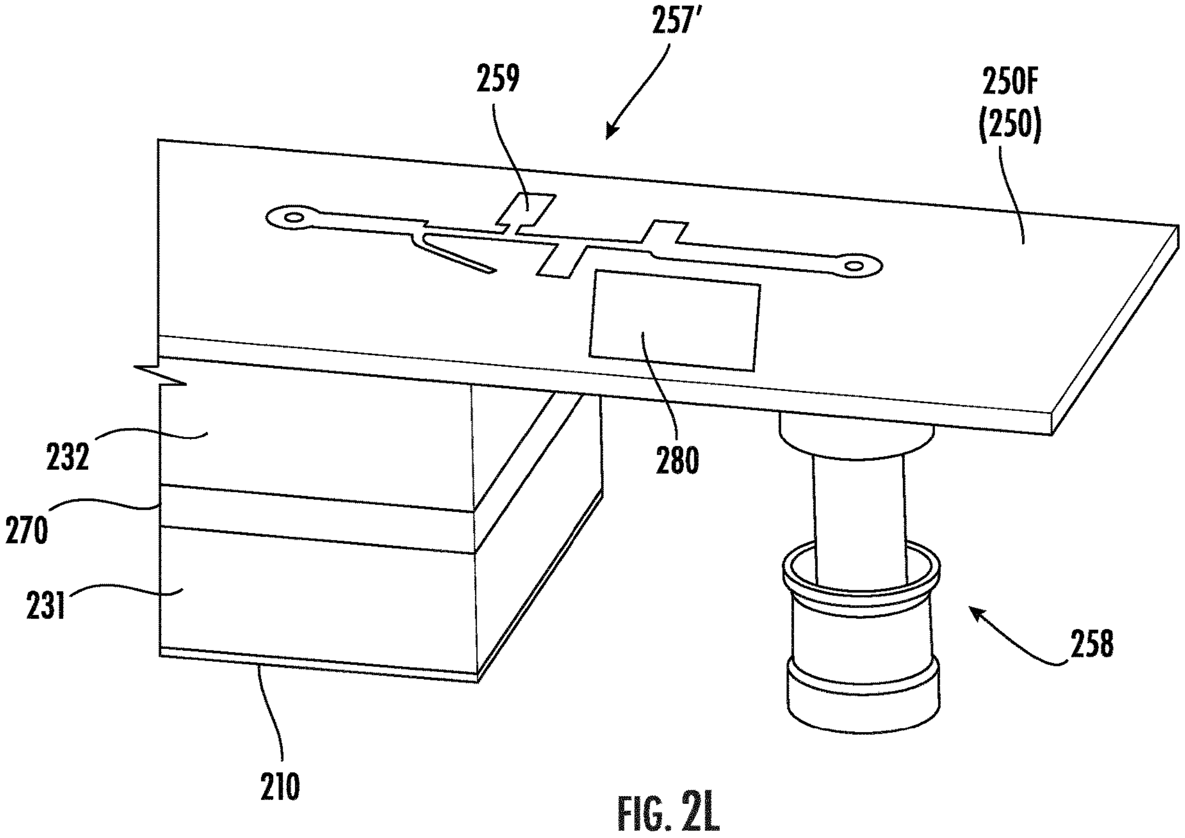
FIG. 2L is an enlarged view of a low-pass filter on a portion of the feed board of FIG. 2K.

FIG. 2L is an enlarged view of a low-pass filter ("LPF") 257' that is on a portion of the front surface 250F of the feed board 250 of FIG. 2K and coupled to a connector 258. The LPF 257' modifies the transmission line 257 (FIG. 2K) by adding metal stubs 259 that project in the direction Y (FIG. 2A) from a metal trace on the front surface 250F. The LPF 257' may be configured to cut off spurious/parasitic resonances (e.g., frequencies above 3.8 GHz and up to 20 GHz). The LPF 257' may be in various locations. For example, positioning the LPF 257' on the front surface 250F, as shown in FIG. 2L, can provide space and/or cost savings relative to other positions. In other examples, the LPF 257' may be (a) inside the connector 258 (e.g., the LPF 257' may be implemented as part of the connector 258), which can provide good RF performance, or (b) inside a cavity provided by conductive walls 235, 236 (FIGS. 2G, 2H and 2I) of the filter device 165 (FIG. 2K).

Moreover, the feed board 250 may have one or more openings/cutouts 280 in the dielectric substrate 252 (FIG. 2D) thereof. The openings/cutouts 280 can reduce dielectric losses that may occur due to the substrate 252. In some embodiments, the openings/cutouts 280 may be adjacent, and spaced apart from, the connector 258. As an example, an opening/cutout 280 may extend alongside a portion of the LPF 257'.

Figure 2M:
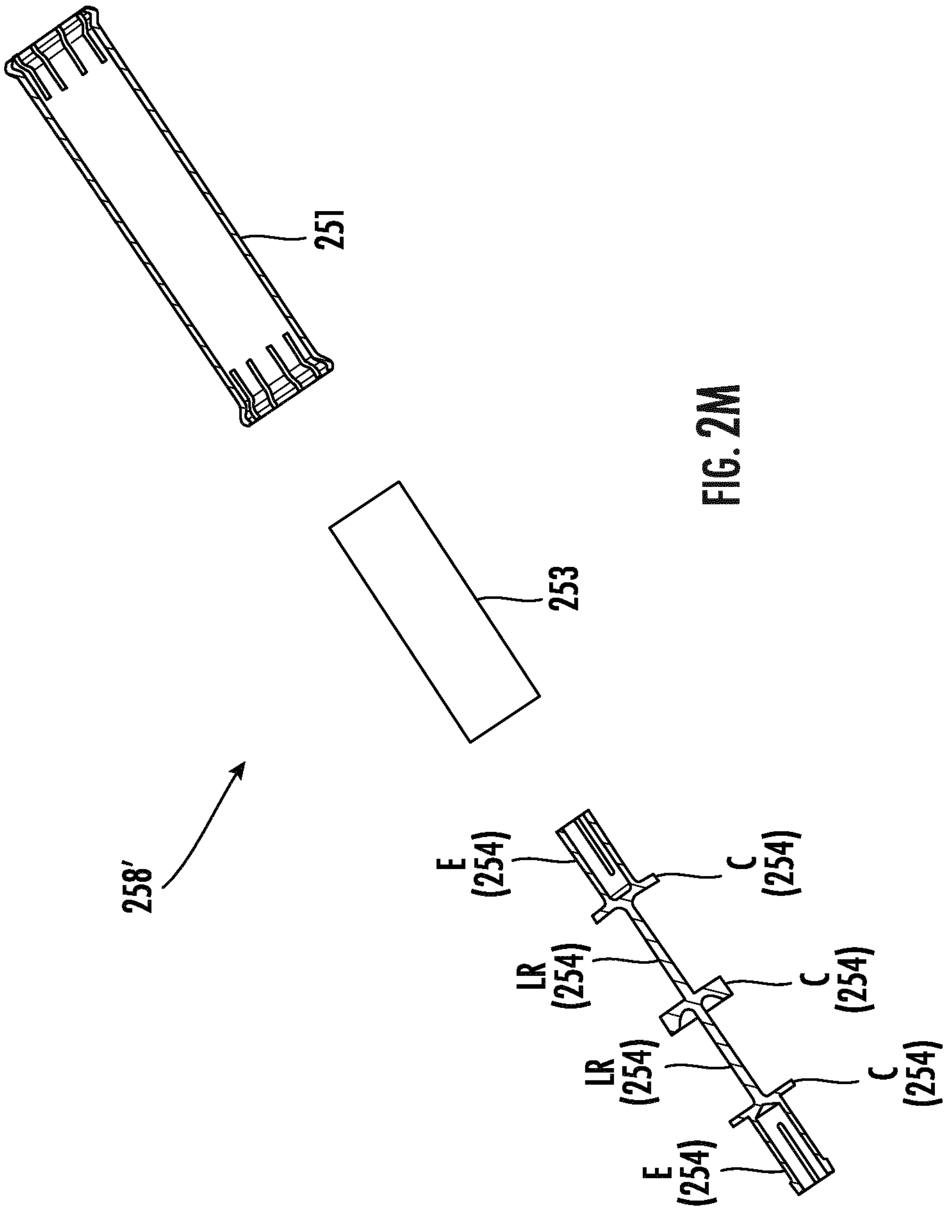
FIG. 2M is an exploded cross-sectional view of a radio connector that includes a stepped-impedance conductor, according to embodiments of the present invention.

FIG. 2M is an exploded cross-sectional view of a radio connector 258' that includes a stepped-impedance conductor 254, according to embodiments of the present invention. The connector 258', which may be used in place of the connector 258 (FIG. 2K), includes an outer conductor 251, the conductor 254 (which serves as an inner conductor), and an annular dielectric 253 that is between the two conductors 251, 254. The conductor 254 has multiple diameters. For example, the conductor 254 has opposite end portions E that have wider diameters than narrow regions LR of a middle portion that is therebetween. As a result, an impedance of the connector 258' may vary along a length of the conductor 254, such as from (a) 50 ohms at one end E, then to (b) an impedance lower than 50 ohms in a wider region C of the middle portion, then to (c) an impedance higher than 50 ohms in a narrow region LR of the middle portion, and then to (d) 50 ohms again at the opposite end E. In some embodiments, the conductor 254 may have more than two impedance transitions/steps, and thus more than three different portions/regions that are used to vary the diameter of the conductor 254. Moreover, the variable diameter may be implemented with one or more rings and one or more grooves along the length of the conductor 254.

According to some embodiments, the connector 258' can be used together with the LPF 257' (FIG. 2L) and/or one or more openings/cutouts 280 (FIG. 2L). For example, the connector 258' and the LPF 257' can both provide LPF functionality, and thus may be collectively referred to herein as a "split LPF" for an RF filter F (FIG. 2K). In other embodiments, the connector 258' may be implemented with an RF filter F while omitting the LPF 257', or vice versa, and/or the opening(s)/cutout(s) 280 may be implemented without the connector 258' or the LPF 257'.

Figure 2N:
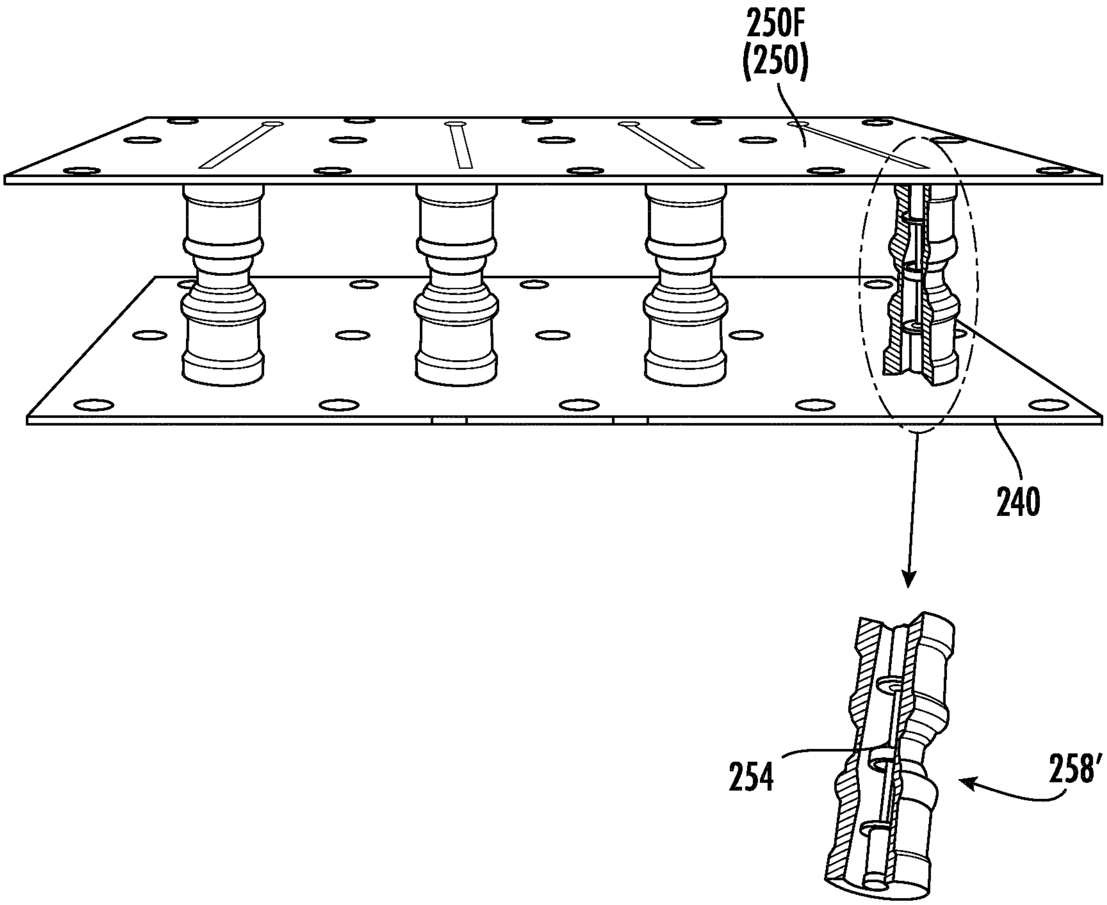
FIG. 2N is a side perspective view of a radio connector that couples a feed board to a radio PCB, according to embodiments of the present invention.

FIG. 2N is a side perspective view of a radio connector 258' that couples a feed board 250 to a radio PCB 240, according to embodiments of the present invention. For simplicity of illustration, the connector 258' is depicted semi-transparently to reveal a stepped-impedance conductor 254 therein. The PCB 240 may be part of the radio 142 (FIG. 1C). Moreover, the feed board 250 is shown with a plurality of connectors 258' coupled thereto, and thus may cover a plurality of RF filters F (FIG. 2A). For example, the feed board 250 may cover 4-8 filters F.

FIG. 2O is a schematic side view of the feed board 250 of FIG. 2K with radiating elements RE thereon. In some embodiments, the feed board 250 may be on top of (e.g., may be a cover for) the conductive housing 230. The feed board 250 is part of an RF device 200, which integrates the filter bank 260 of a filter device 165 with a plurality of radiating elements RE (e.g., of the same array 170) on the feed board 250. The radiating elements RE may be coupled to resonators R of the filter bank 260 by a connector 220 (FIG. 2B) that is omitted from view in FIG. 2O for simplicity of illustration. In some embodiments, the device 200 may also include feed circuitry 156/157 (FIG. 1C) on the feed board 250. Though the filter bank 260 and the conductive housing 230 are shown in FIG. 2O, the device 200 may instead be implemented with the filter bank 260' and the conductive housing 230' (FIG. 2H) or the filter bank 260" and the conductive housing 230" (FIG. 21). Moreover, though RF connectors 221 are shown in FIG. 2O as being outside of the housing 230, the connectors 221 may instead be inside conductive walls 235, 236 (FIG. 2G) of the housing 230.

As shown in FIG. 2O, a plurality of radiating elements RE may extend forward, in the direction Z, from a front surface 250F of the feed board 250 that is opposite the rear surface 250R. Each filter F (FIG. 2K) will typically feed two to four radiating elements RE on the feed board 250. Accordingly, the filter bank 260 shown in FIG. 2G as having eight filters F-1 through F-8 may be coupled to sixteen to thirty-two radiating elements RE that are on the opposite side of the feed board 250 from the filter bank 260. In embodiments in which the antenna 100 (FIG. 1C) comprises a MIMO antenna with sixty-four filters F, the filters F may collectively feed at least one hundred twenty-eight radiating elements RE. Moreover, in some cases, each filter F may feed as many as six radiating elements RE.

The radiating elements RE may have various shapes and/or structures, and thus are not limited to the example shapes/structures shown in FIG. 2O. For example, the radiating elements RE may be sheet-metal radiating elements that may be implemented with various shapes and/or feeding techniques. In some embodiments, the radiating elements RE may be patch radiating elements or crossed-dipole radiating elements. Moreover, for simplicity of illustration, the cover 210 (FIG. 2F), which covers rear surfaces of the resonators R, is omitted from view in FIG. 2O.

Figure 3A:
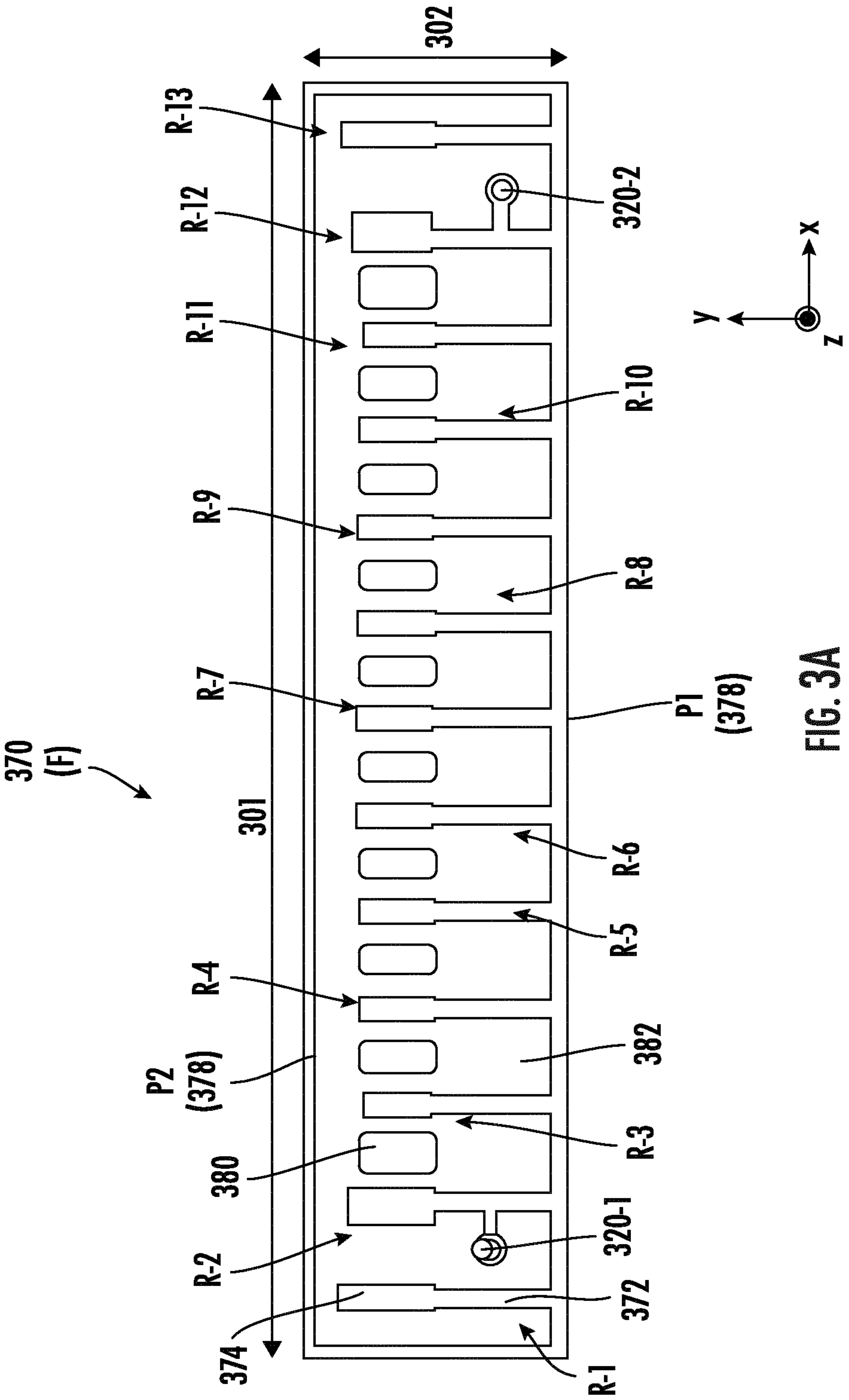
FIGS. 3A and 3B are front perspective views of different examples of an RF filter on a PCB of the filter device of FIG. 1C, with the feed board that covers the PCB removed, according to embodiments of the present invention.
Figure 3B:
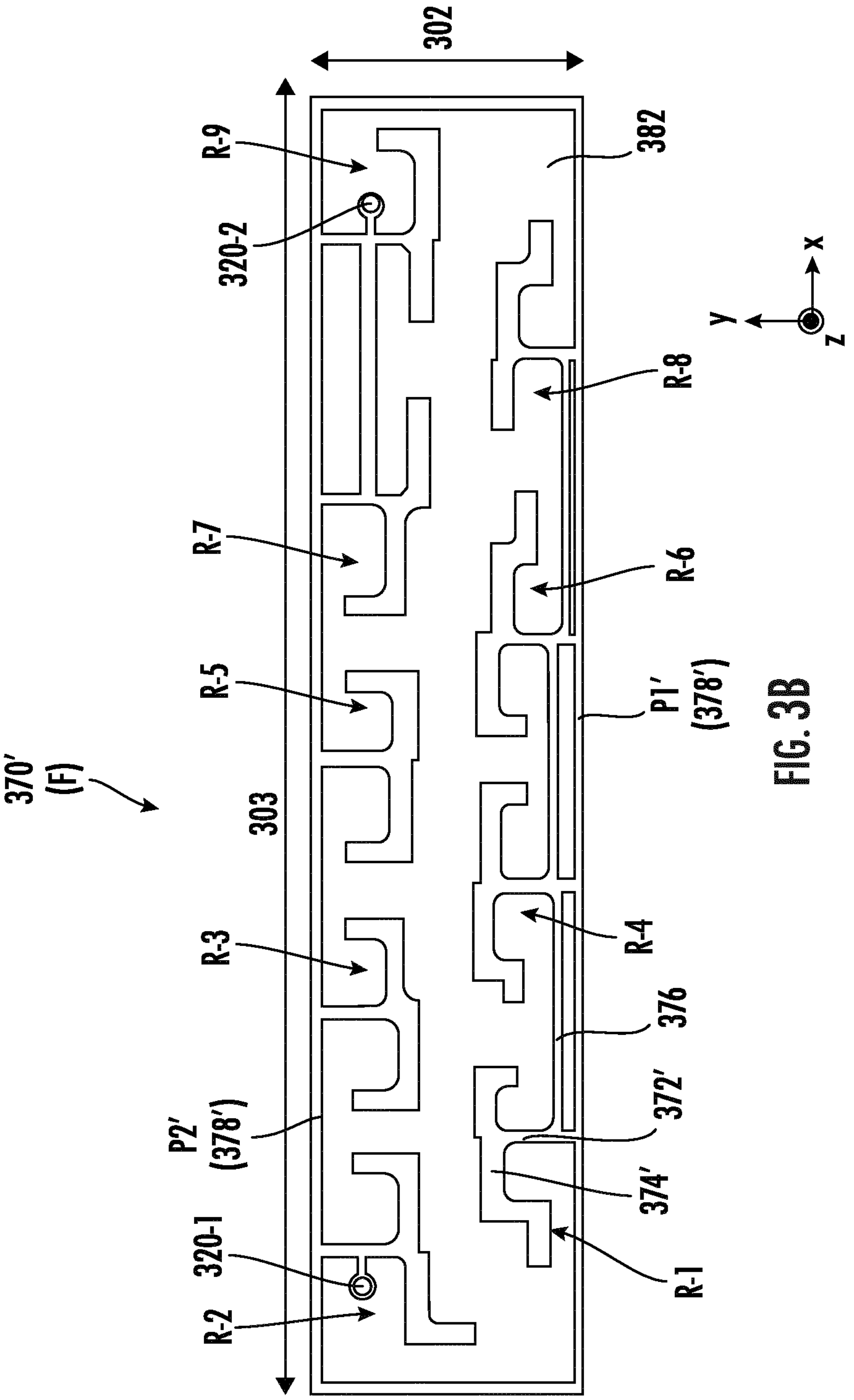

FIGS. 3A and 3B are front perspective views of different examples of an RF filter F on a PCB 370 of the filter device 165 of FIG. 1C, with the feed board 250 (FIG. 31) that covers the PCB 370 removed, according to embodiments of the present invention. As shown in FIG. 3A, a PCB 370 may have a plurality of resonators, referred to collectively as "R", thereon. For example, thirteen resonators R-1, R-2, R-3, R-4, R-5, R-6, R-7, R-8, R-9, R-10, R-11, R-12 and R-13 may extend in the direction Y from a first portion P1 of a metal perimeter 378 that is on the PCB 370 toward a second portion P2 of the metal perimeter 378 that is opposite the first portion P1. Each resonator R may have a stalk 372 that is physically and electrically connected to the first portion P1 and a head 374 that is adjacent and spaced apart from the second portion P2. The resonators R may thus all be arranged/aligned in a single line along the direction X.

Eleven middle resonators R-2, R-3, R-4, R-5, R-6, R-7, R-8, R-9, R-10, R-11 and R-12 may each be coupled to an adjacent resonator R via a metallized opening 380, which may be formed by removing a portion of a dielectric substrate 382 of the PCB 370 and metallizing (e.g., metal-plating) sidewalls of the substrate 382 that are exposed by the removal. For example, FIG. 3A shows that heads 374 of (i) the resonators R-2, R-3 are coupled to each other via a metallized opening 380 therebetween, (ii) the resonators R-3, R-4 are coupled to each other via a metallized opening 380 therebetween, (iii) the resonators R-4, R-5 are coupled to each other via a metallized opening 380 therebetween, (iv) the resonators R-5, R-6 are coupled to each other via a metallized opening 380 therebetween, (v) the resonators R-6, R-7 are coupled to each other via a metallized opening 380 therebetween, (vi) the resonators R-7, R-8 are coupled to each other via a metallized opening 380 therebetween, (vii) the resonators R-8, R-9 are coupled to each other via a metallized opening 380 therebetween, (viii) the resonators R-9, R-10 are coupled to each other via a metallized opening 380 therebetween, (ix) the resonators R-10, R-11 are coupled to each other via a metallized opening 380 therebetween, and (x) the resonators R-11, R-12 are coupled to each other via a metallized opening 380 therebetween. The PCB 370 may thus have ten metallized openings 380 that couple (e.g., capacitively couple) the eleven middle resonators R-2, R-3, R-4, R-5, R-6, R-7, R-8, R-9, R-10, R-11 and R-12 to each other.

Outermost resonators R-1, R-13, on the other hand, are not coupled to another resonator R by a metallized opening 380. The resonators R-1, R-13 may thus be outermost resonators. In some embodiments, lateral metal links, which may be configured to function similarly to the linking portions 276 shown in FIG. 2C, may be on the PCB 370 and may physically and electrically connect stalks 372 of the middle resonators R-2, R-3, R-4, R-5, R-6, R-7, R-8, R-9, R-10, R-11 and R-12 to each other, while such lateral metal links may not project from the stalks 372 of the outermost resonators R-1, R-13. Moreover, the substrate 382 may increase capacitance between the resonators R.

The filter F may be coupled to radiating elements RE (FIG. 31) and the radio 142 (FIG. 1C) by RF input/output connectors 320. For example, the connectors 320 may include a first connector 320-1 that couples the stalk 372 of the resonator R-2 to the radiating elements RE via a feed board 250 (FIG. 31), and a second connector 320-2 that couples the stalk 372 of the resonator R-12 to the radio 142, such as via the feed board 250 and an RF connector 221 (FIG. 2K). The connectors 320-1, 320-2 may thus be referred to herein as an "antenna connector" and a "radio connector," respectively.

The resonators R on the PCB 370 may comprise, for example, copper resonators that are formed by selectively etching a copper layer on the substrate 382 of the PCB 370. The perimeter 378 may also comprise copper that is formed by this selective etching. The resonators R on the PCB 370 may collectively provide two transmission zeros. Moreover, compared with a filter F comprising resonators R that are part of the non-PCB flat piece 270 (FIG. 2C), resonators R of the filter F on the PCB 370 may be smaller, which can reduce both weight and cost. The filter F on the PCB 370 may have a length 301 in the direction X and a width 302 in the direction Y. As an example, the length 301 and the width 302 may be about 100 mm and about 20 mm, respectively. The length 301 may thus be shorter than the length 1 of the filter F shown in FIG. 2A.

As shown in FIG. 3B, a filter F may have nine resonators R-1, R-2, R-3, R-4, R-5, R-6, R-7, R-8 and R-9 on a PCB 370'. The PCB 370' may thus have fewer resonators R thereon than the PCB 370 (FIG. 3A). Also, unlike the middle resonators R on the PCB 370, the resonators R on the PCB 370' may not be coupled to each other via metallized openings 380 in the substrate 382. Rather, a first row/line of resonators R (including resonators R-1, R-4, R-6, and R-8) projects in the direction Y from a first portion P1' of a metal perimeter 378' that is on the PCB 370' toward a second row/line of resonators R (including resonators R-2, R-3, R-5, R-7, and R-9) that projects in the direction Y from a second portion P2' of the perimeter 378' that is opposite the first portion P1'. The first and second rows/lines of resonators R are capacitively coupled to each other in the direction Y. For example, each resonator R may be a T-shaped resonator having a stalk 372' and a head 374', and the head 374' of each resonator R in the first row/line may be capacitively coupled to two heads 374' of resonators R in the second row/line.

Resonators R on the PCB 370' that are arranged/aligned in the same row/line along the direction X may also be coupled to each other. For example, the head 374' of the resonator R-3 may be coupled to heads 374' of the resonators R-2, R-5. Moreover, stalks 372' of some of the resonators R on the PCB 370' may be physically and electrically connected to each other by lateral metal links 376. As an example, the resonators R-7, R-9, which may be spaced apart from each other by a greater distance in the direction X than other adjacent resonators R that are in the same row/line as the resonators R-7, R-9, may be coupled to each other by a link 376. Adjacent ones of the resonators R-1, R-4, R-6, R-8 may also be coupled to each other by links 376.

Resonators R on the PCB 370' may comprise, for example, copper resonators that are formed by selectively etching a copper layer on the substrate 382 of the PCB 370'. Such resonators R (as well as those of the PCB 370) may thus be referred to herein as "PCB resonators." The perimeter 378' and the links 376 may also comprise copper that is formed by this selective etching. The resonators R on the PCB 370' may collectively provide four transmission zeros. The filter F on the PCB 370' may have a length 303 in the direction X and the width 302 in the direction Y. For example, the length 303 may be about 96 mm, and thus may be even shorter than the length 301 of the filter F on the PCB 370 shown in FIG. 3A.

Figure 3C:
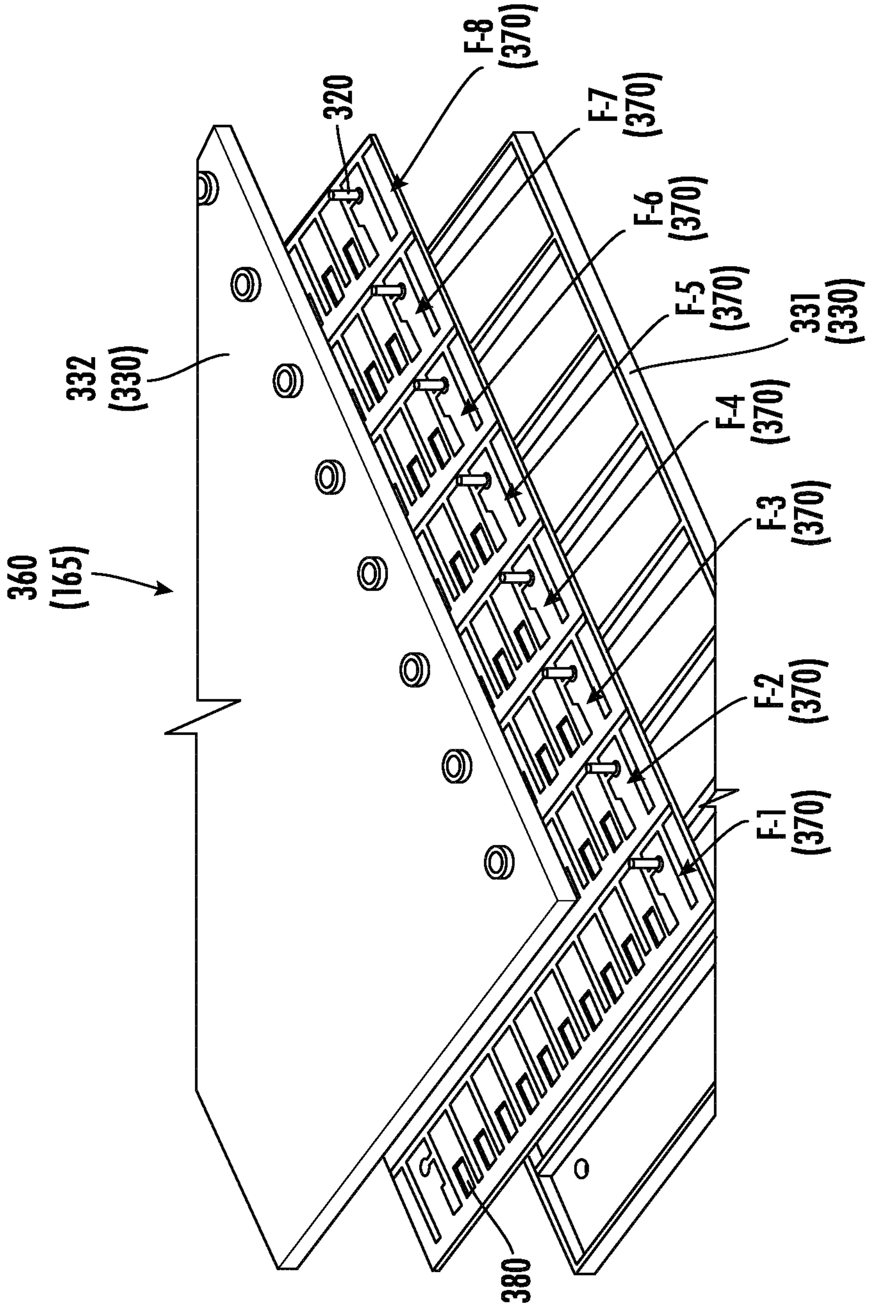
FIG. 3C is an exploded front perspective view of an RF filter bank having the PCB of FIG. 3A.

FIG. 3C is an exploded front perspective view of an RF filter bank 360 having the PCB 370 of FIG. 3A. As shown in FIG. 3C, the filter bank 360 includes multiple filters F, such as eight filters F-1, F-2, F-3, F-4, F-5, F-6, F-7 and F-8, that share the PCB 370. Each filter F has a plurality of resonators R that are in line with each other in the direction X (FIG. 3A) and part of the PCB 370.

Though a conductive housing 330 having two closed (e.g., closed-top/closed-bottom) metal shells 331, 332 is shown for the filter bank 360, open metal shells similar to (but shorter in the direction X than) the metal shells 231, 232 (FIG. 2G) may instead be used to separate adjacent filters F on the PCB 370 from each other. In other embodiments, the filters F of the filter bank 360 may be on respective PCBs 370 that are supported by ledge portions 234 (FIG. 2H) of a monolithic conductive housing similar to (but shorter in the direction X than) the conductive housing 230' (FIG. 2H).

The filter bank 360 may be covered by a feed board 250 (FIG. 31). In some embodiments, the feed board 250 may comprise feed circuitry 157 (FIG. 1C) that is coupled between the filter bank 360 and radiating elements RE (FIG. 31) that are on an opposite side of the feed board 250 from the resonators R. Moreover, each inner wall 235-U (FIG. 2G) of the shell 232 of the conductive housing 230 (FIG. 2G) may be between adjacent filters F, and between the feed board 250 and the PCB 370.

Figure 3D:
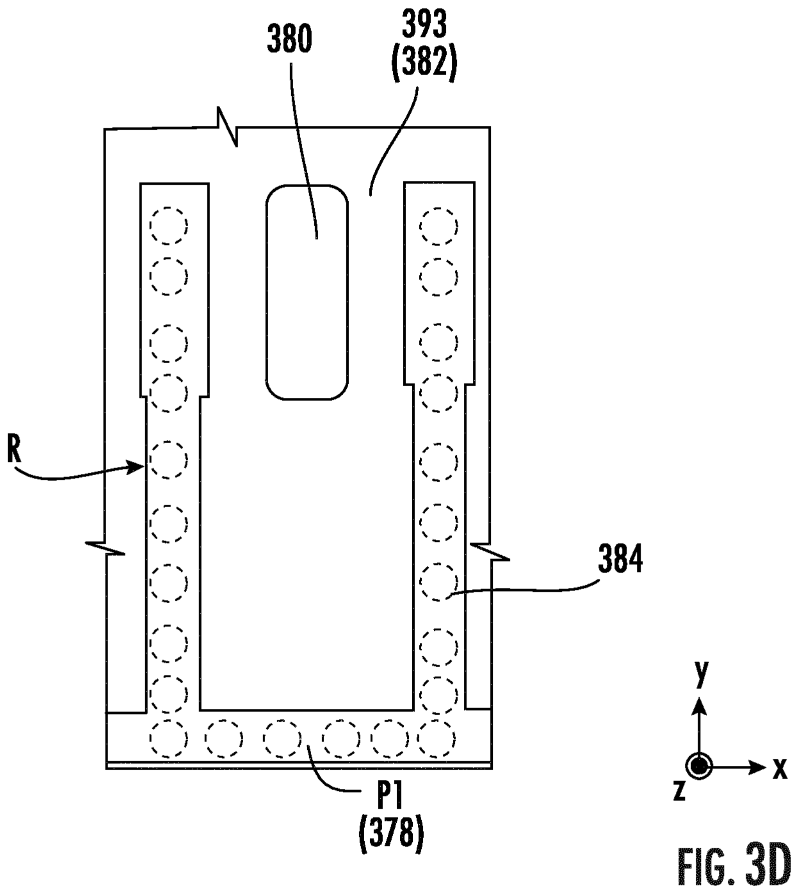
FIG. 3D is an enlarged view of a portion of the PCB of FIG. 3A.

FIG. 3D is an enlarged view of a portion of the PCB 370 of FIG. 3A. As shown in FIG. 3D, adjacent in-line resonators R are arranged/aligned with each other in the direction X on a first surface 393 of the substrate 382. Each resonator R may have a plurality of plated through holes ("PTHs") 384 therein. For example, six or more (e.g., nine) PTHs 384 may be arranged/aligned with each other in the direction Y in each resonator R. A metallized opening 380, which is wider in both the direction X and the direction Y than each PTH 384, may be between the adjacent resonators R. Moreover, the first portion P1 of the metal perimeter 378 may have PTHs 384 therein that are arranged/aligned with each other in the direction X.

Figure 3E:
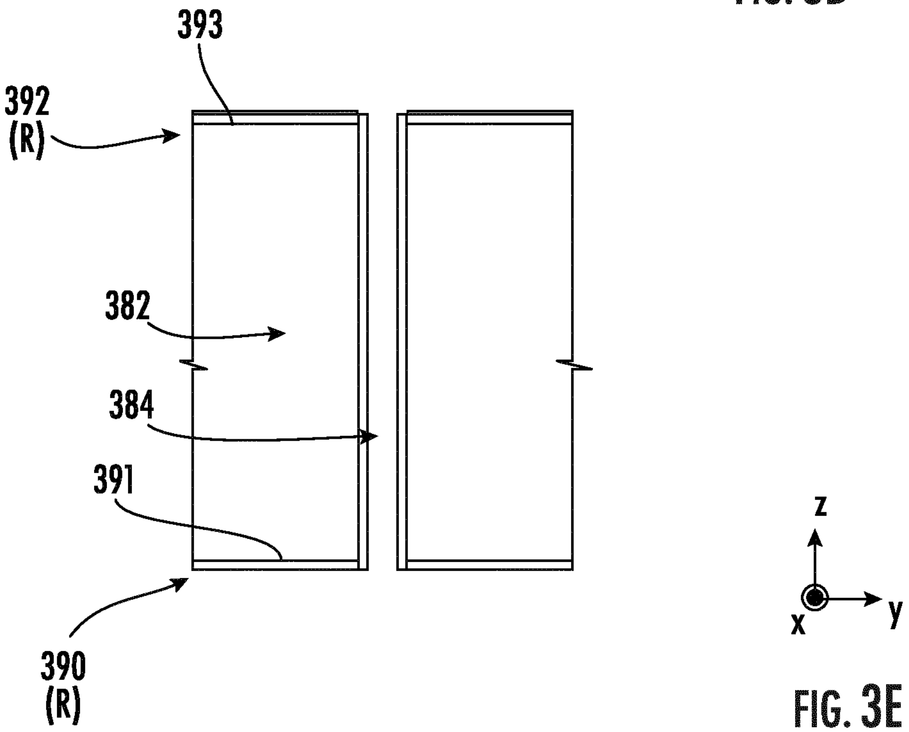
FIG. 3E is a cross-sectional view of a portion of the PCB of FIG. 3A.

FIG. 3E is a cross-sectional view of a portion of the PCB 370 of FIG. 3A. As shown in FIG. 3E, a resonator R may be on both the first surface 393 of the substrate 382 and a second surface 391 of the substrate 382 that is opposite the first surface 393. For example, opposite first and second portions of the resonator R may be part of first and second metal layers 392, 390, respectively, that are on the first and second surfaces 393, 391, respectively, of the substrate 382. Accordingly, the metal design/layout in FIG. 3A shows only one of the metal layers 392, 390 and may repeat on the opposite side of the substrate 382. Each metal layer 392, 390 may have a thickness in the direction Z of about 35 micrometers ("μm"), and the substrate 382 may have a thickness in the direction Z of about 0.5 mm or about 1 mm.

A PTH 384 may extend in the direction Z (i) through the first portion of the resonator R that is part of the first metal layer 392, (ii) through the substrate 382, and (iii) through the second portion of the resonator R that is part of the second metal layer 390. The PTH 384 comprises metal plating that physically and electrically connects the opposite first and second portions of the resonator R to each other. As a result, dielectric losses of the PCB 370 may be reduced. In some embodiments, the PTHs 384 may be metal-filled vias.

Figure 3F:
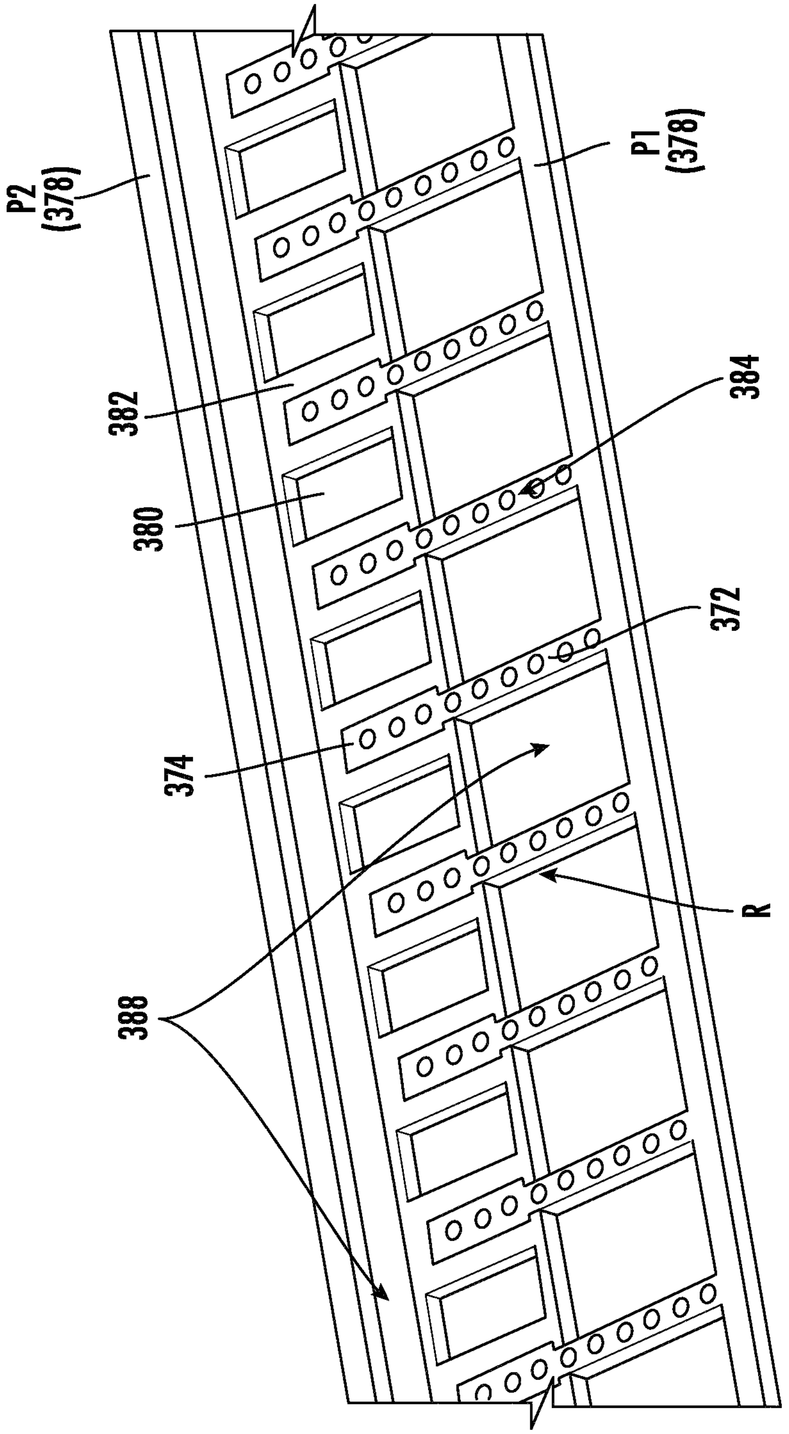
FIG. 3F is an enlarged view of a portion of the PCB of FIG. 3A with openings therein.

FIG. 3F is an enlarged view of a portion of the PCB 370 of FIG. 3A with openings 388 therein. The openings 388 are places where dielectric material has been removed from the substrate 382. For example, the openings 388 may include (i) an opening 388 that is adjacent the second portion P2 of the metal perimeter 378, such as between all of the heads 374 of the resonators R and the second portion P2 in the direction Y (FIG. 3A), and (ii) a plurality openings 388 that are between adjacent stalks 372 of the resonators R in the direction X (FIG. 3A). The metallized openings 380 may be between, in the direction Y, the two types of openings 388. Unlike the metallized openings 380, sidewalls of the substrate 382 that are exposed by the removal of dielectric material to form the openings 388 may not be metallized. Moreover, each opening 388 may be wider in the direction X than each metallized opening 380. The openings 388 can reduce dielectric losses of the PCB 370.

In some embodiments, the stalk 372 and the head 374 of each resonator R may both have a plurality of PTHs 384 therein, as shown in FIG. 3F. In other embodiments, portions of openings 388 that define sidewalls of the stalk 372 may be metallized and PTHs 384 may be omitted from the stalk 372. PTHs 384 may still be present in the head 374, however, even if they are omitted from the stalk 372.

Figure 3G:
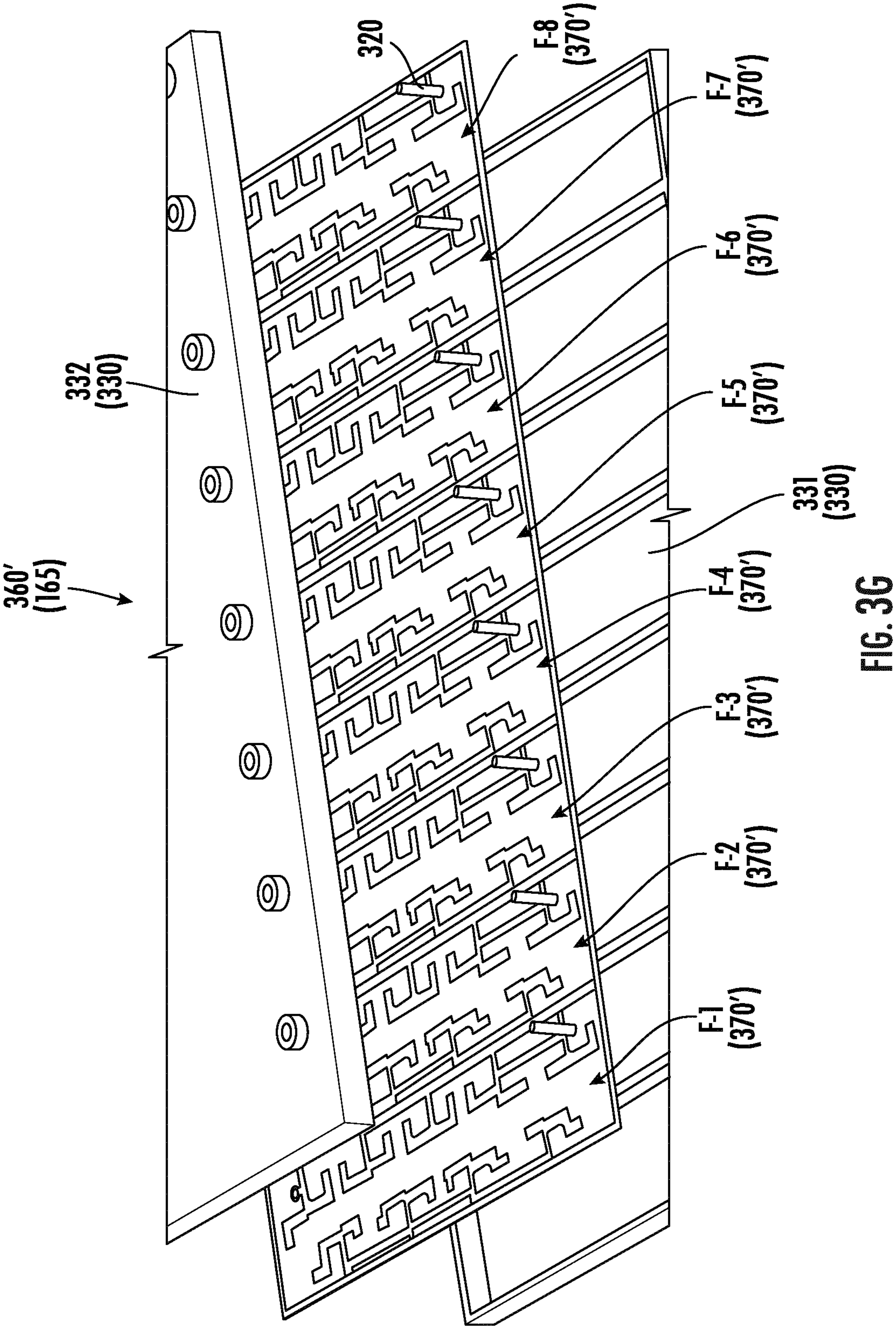
FIG. 3G is an exploded front perspective view of an RF filter bank having the PCB of FIG. 3B.

FIG. 3G is an exploded front perspective view of an RF filter bank 360' having the PCB 370' of FIG. 3B. As shown in FIG. 3G, the filter bank 360' includes multiple filters F, such as eight filters F-1, F-2, F-3, F-4, F-5, F-6, F-7 and F-8, that share the PCB 370'. Each filter F has first and second groups/lines of resonators R that are opposite, and capacitively coupled to each other, in the direction Y (FIG. 3B) on the PCB 370'.

Though the conductive housing 330 having two closed (e.g., closed-top/closed-bottom) metal shells 331, 332 is shown for the filter bank 360', open metal shells similar to (but shorter in the direction X than) the metal shells 231, 232 (FIG. 2G) may instead be used to separate adjacent filters F on the PCB 370' from each other. In other embodiments, the filters F of the filter bank 360' may be on respective PCBs 370' that are supported by ledge portions 234 (FIG. 2H) of a monolithic conductive housing similar to (but shorter in the direction X than) the conductive housing 230' (FIG. 2H).

Figure 3H:
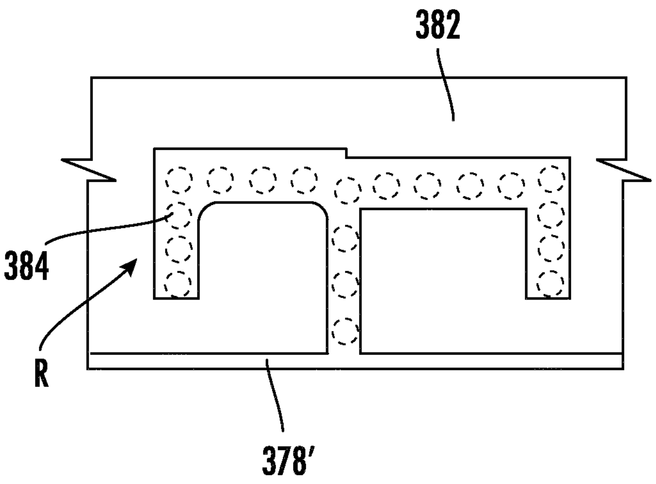
FIG. 3H is an enlarged view of a portion of the PCB of FIG. 3B.

FIG. 3H is an enlarged view of a portion of the PCB 370' of FIG. 3B. As shown in FIG. 3H, each resonator R on the PCB 370' may have a plurality of PTHs 384 therein. For example, ten or more (e.g., nineteen) PTHs 384 may be in each resonator R. The metal perimeter 378' may also have a plurality of PTHs 384 therein. For simplicity of illustration, however, PTHs 384 are not shown in the metal perimeter 378' in FIG. 3H. For further simplicity of illustration, a cross-sectional view that includes a PTH 384 in the PCB 370' is not provided. Opposite first and second portions of a resonator R on the PCB 370', however, may be coupled to each other by PTHs 384 similarly to what is shown in FIG. 3E with respect to the PCB 370. The PTHs 384 may be metal-filled PTHs in some embodiments.

FIG. 31 is a schematic side view of a feed board 250 that covers the PCB 370 of FIG. 3A. For example, the feed board 250 may be on top of (e.g., may be a cover for) the conductive housing 230 that houses the PCB 370. A ground plane G on a rear surface 250R of the feed board 250 may be opposite (e.g., may face, cover, and be spaced apart from) a front surface of the PCB 370. In some embodiments, a ground plane G of a single feed board 250 may cover all eight filters F-1, F-2, F-3, F-4, F-5, F-6, F-7 and F-8 (FIG. 3C), referred to collectively as "F," of the filter bank 360. Moreover, the ground plane G of the single feed board 250 may, according to some embodiments, cover more than eight filters F, such as by covering multiple filter banks 360 (e.g., multiples of eight filters F).

Figure 3I:
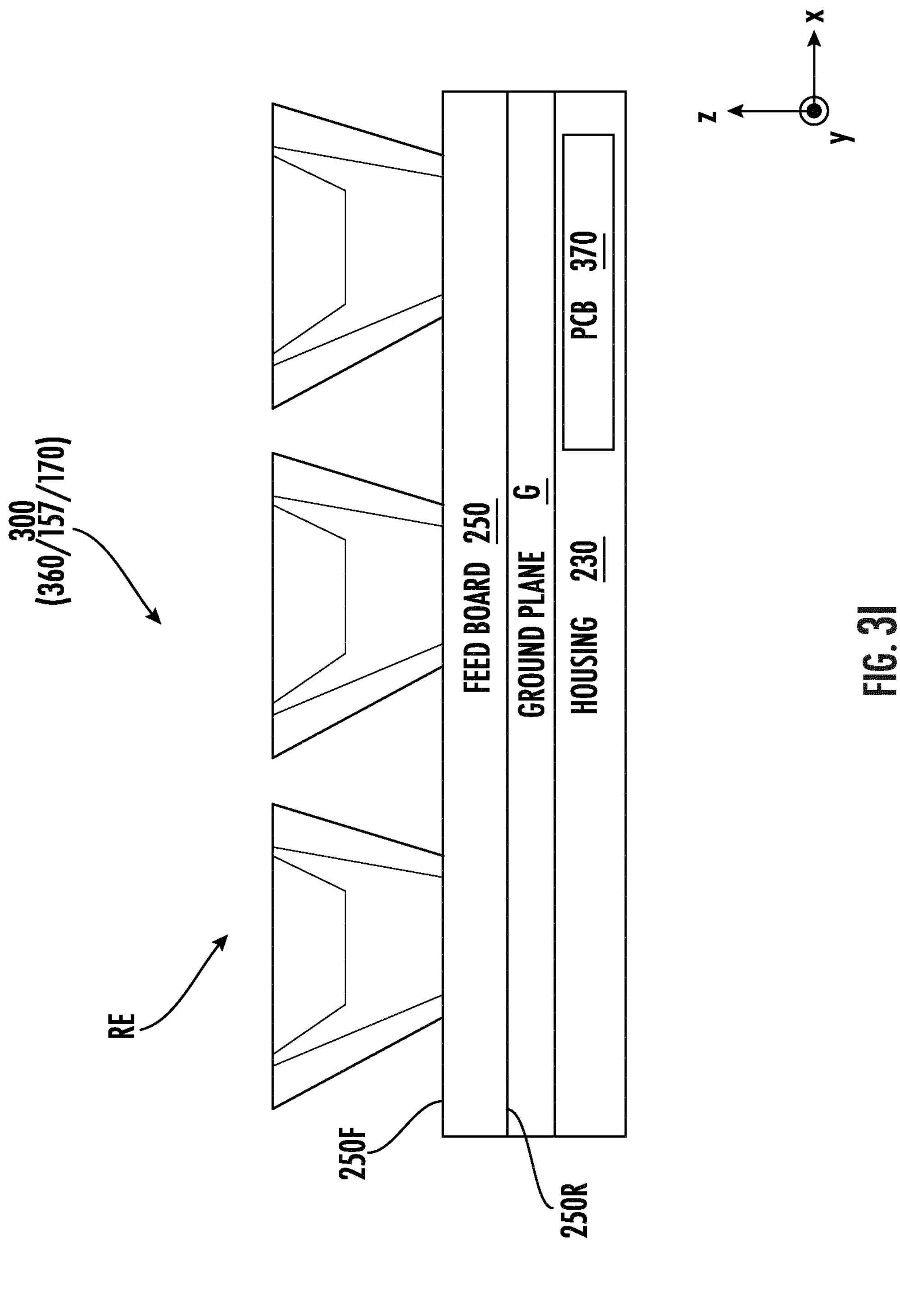
FIG. 3I is a schematic side view of a feed board that covers the PCB of FIG. 3A.

The feed board 250 is part of an RF device 300, which integrates the filter bank 360 of a filter device 165 with a plurality of radiating elements RE (e.g., of the same array 170) on the feed board 250. The radiating elements RE may be coupled to resonators R of the filter bank 360 by a connector 320 (FIG. 3A) that is omitted from view in FIG. 3I for simplicity of illustration. In some embodiments, the device 300 may also include feed circuitry 156/157 (FIG. 1C) on the feed board 250. Though the filter bank 360 and the conductive housing 230 are shown in FIG. 3I, the device 200 may instead be implemented with the filter bank 360' (FIG. 3G) and/or the conductive housing 230' (FIG. 2H). Moreover, though radio connectors are omitted from view in FIG. 31 for simplicity of illustration, connectors 221 may be outside of the housing 230 or inside conductive walls 235, 236 (FIG. 2G) of the housing 230.

As shown in FIG. 3I, a plurality of radiating elements RE may extend forward, in the direction Z, from a front surface 250F of the feed board 250 that is opposite the rear surface 250R. Each filter F (FIG. 3A) will typically feed two to four radiating elements RE on the feed board 250. Accordingly, the filter bank 360 shown in FIG. 3C as having eight filters F-1, F-2, F-3, F-4, F-5, F-6, F-7 and F-8 may be coupled to sixteen to thirty-two radiating elements RE that are on the opposite side of the feed board 250 from the filter bank 360. In embodiments in which the antenna 100 (FIG. 1C) comprises a MIMO antenna with sixty-four filters F, the filters F may collectively feed at least one hundred twenty-eight radiating elements RE. Moreover, in some cases, each filter F may feed as many as six radiating elements RE.

The radiating elements RE may have various shapes and/or structures, and thus are not limited to the example shapes/structures shown in FIG. 3I. For example, the radiating elements RE may be sheet-metal radiating elements that may be implemented with various shapes and/or feeding techniques. In some embodiments, the radiating elements RE may be patch radiating elements or crossed-dipole radiating elements. Moreover, for simplicity of illustration, a tuning cover 210 (FIG. 2F) that covers a rear side of the PCB 370 is omitted from view in FIG. 3I.

Figure 20:
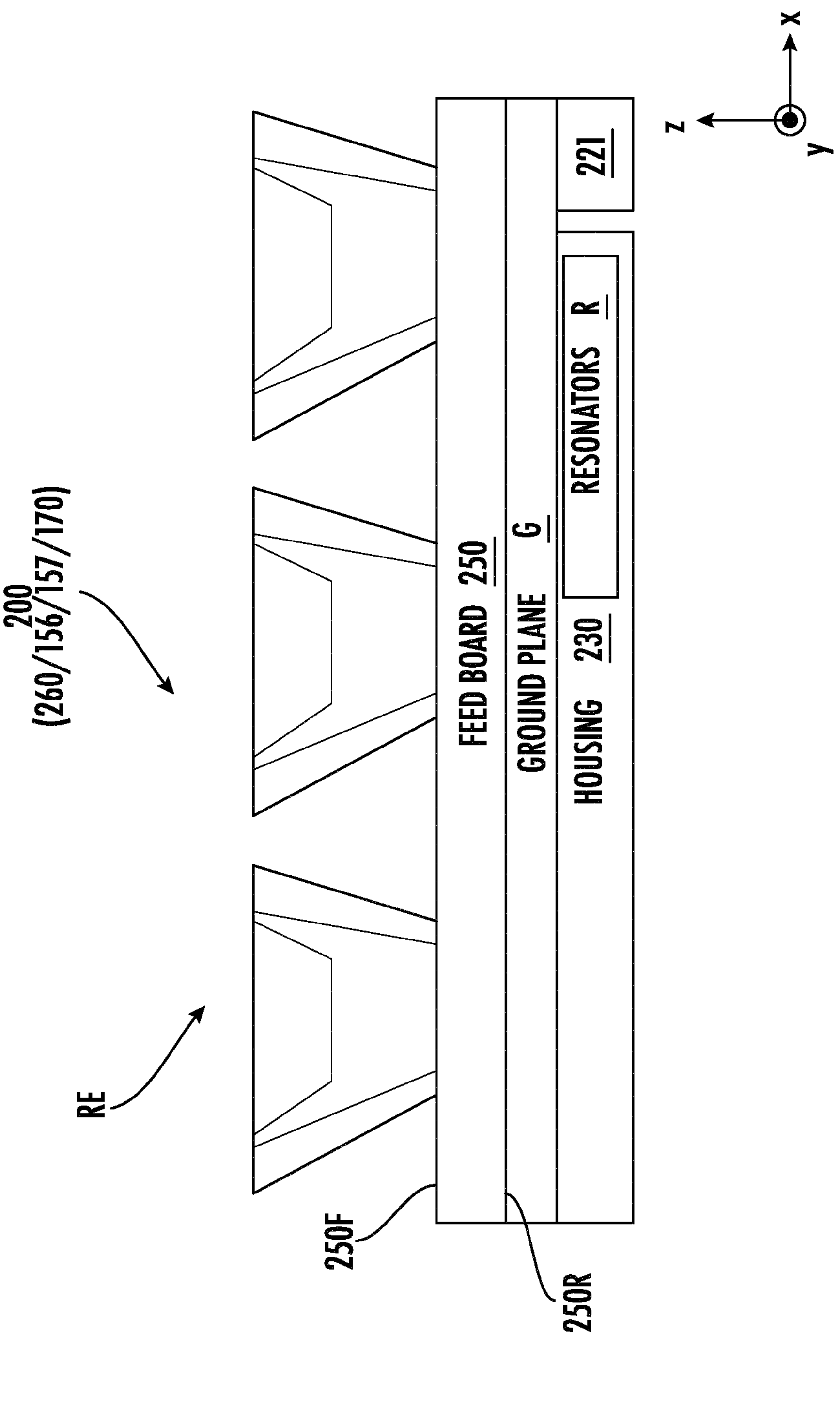

RF devices 200, 300 (FIGS. 20, 31, respectively) according to embodiments of the present invention may provide a number of advantages. These advantages include providing a more-compact, lighter-weight, and/or lower-cost antenna 100 (FIG. 1C) by covering RF filters F (FIGS. 2A, 3A) with a feed board 250 that feeds radiating elements RE (FIGS. 20, 31). For example, a ground plane G (FIGS. 20, 31) that is on an opposite side of the feed board 250 from the radiating elements RE may provide a conductive cover for the filters F. Accordingly, the filters F and the feed board 250 may be a single, integrated component rather than separate components.

In some embodiments, resonators R of the device 300 may be PCB resonators that are smaller than resonators R of the device 200. The device 300 may thus be less expensive and have a lighter weight than the device 200.

Moreover, the devices 200, 300 can have good RF performance. For example, the filter bank 260 (FIG. 2G) of the device 200 can achieve a lower-side guard band (between a stop band and a pass band) of about 16 megahertz ("MHz"). This can leave about 4 MHz to account for temperature drift, design, and tuning margins. First spurious/parasitic resonances for the filter bank 260 may appear at about 7.5 GHz, and center-band insertion loss may be about 0.45 decibels ("dB") and may not exceed 2 dB at a lower edge (e.g., 3,410 MHz) of the pass band.

First spurious/parasitic resonances for the filter bank 360 (FIG. 3C) of the device 300 may appear at about 7.5 GHZ, and first spurious/parasitic resonances for the filter bank 360' (FIG. 3G) may appear at about 5.5 GHz. Moreover, each filter F of the devices 200, 300 may be a band-pass filter, which may be configured to pass frequencies between 3.4 GHz and 3.8 GHz.

The present invention has been described above with reference to the accompanying drawings. The present invention is not limited to the illustrated embodiments. Rather, these embodiments are intended to fully and completely disclose the present invention to those skilled in this art. Throughout the detailed description and the drawings, like reference numbers refer to like elements. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," "coupled," and the like can mean either direct or indirect attachment or coupling between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A radio frequency (RF) device comprising:

a filter bank comprising a plurality of RF filters that each comprise a plurality of resonators; and a feed board that covers and is coupled to the filter bank, wherein a first surface of the feed board comprises a plurality of radiating elements thereon, and wherein a second surface of the feed board, opposite the first surface, faces the plurality of resonators.

2. The RF device of claim 1, wherein the filter bank further comprises two metal shells that separate the plurality of resonators of different ones of the plurality of RF filters from each other.

3. The RF device of claim 2, wherein the plurality of resonators of all of the plurality of RF filters are part of a single flat piece that is between the two metal shells.

4. The RF device of claim 1, wherein the filter bank further comprises a conductive housing comprising a plurality of inner walls that separate the plurality of resonators of different ones of the plurality of RF filters from each other, wherein the plurality of resonators of a first of the plurality of RF filters are part of a first flat piece that is supported by a first ledge portion of a first of the inner walls, and wherein the plurality of resonators of a second of the plurality of RF filters are part of a second flat piece that is supported by a second ledge portion of a second of the inner walls.

5. The RF device of claim 1, wherein the filter bank further comprises a conductive housing comprising a plurality of inner walls that separate the plurality of resonators of different ones of the plurality of RF filters from each other, and wherein the plurality of resonators and the inner walls are all part of a single piece.

6. The RF device of claim 1, wherein the second surface of the feed board comprises a ground plane, and wherein the ground plane covers the plurality of resonators.

7. The RF device of claim 6, further comprising a tuning lid that is opposite the ground plane, wherein the plurality of resonators are respective planar resonators that are between the tuning lid and the ground plane.

8. The RF device of claim 1, further comprising first and second RF connectors that couple the plurality of resonators of a first of the plurality of RF filters to the feed board, wherein the plurality of resonators of the first of the plurality of RF filters comprise eleven in-line resonators that are between the first and second RF connectors.

9. The RF device of claim 8, wherein the plurality of resonators of the first of the plurality of RF filters further comprise first and second outermost resonators that are not between the first and second RF connectors.

10. The RF device of claim 1, further comprising a printed circuit board (PCB), wherein the plurality of resonators of a first of the plurality of RF filters are in line with each other and are part of the PCB, and wherein the plurality of resonators of a second of the plurality of RF filters are in line with each other and are part of the PCB.

11. The RF device of claim 1, further comprising a printed circuit board (PCB), wherein a first of the plurality of resonators of a first of the plurality of RF filters is part of the PCB and is opposite and coupled to two others of the plurality of resonators of the first of the plurality of RF filters, and wherein a first of the plurality of resonators of a second of the plurality of RF filters is part of the PCB and is opposite and coupled to two others of the plurality of resonators of the second of the plurality of RF filters.

12. The RF device of claim 1, further comprising a radio connector that is coupled to the feed board, wherein the radio connector comprises a stepped-impedance conductor having multiple diameters.

13. The RF device of claim 12, further comprising a low-pass filter that comprises a metal trace that is on the feed board and coupled to the radio connector.

14. The RF device of claim 13, wherein the feed board comprises an opening therein that is spaced apart from the radio connector.

15. A radio frequency (RF) device comprising:

a printed circuit board (PCB) comprising a plurality of RF filters that each comprise first and second rows of PCB resonators, wherein each of the PCB resonators of the first row of a first of the plurality of RF filters is opposite and coupled to two of the PCB resonators of the second row of the first of the plurality of RF filters, and wherein each of the PCB resonators of the first row of a second of the plurality of RF filters is opposite and coupled to two of the PCB resonators of the second row of the second of the plurality of RF filters; and a feed board that covers and is coupled to the PCB.

16. A radio frequency (RF) device comprising:

a printed circuit board (PCB) comprising a plurality of in-line resonators of a plurality of RF filters of a filter bank; and a feed board that covers and is coupled to the PCB, wherein a first and a second of the plurality of in-line resonators of a first of the plurality of RF filters comprise first and second resonator stalks, respectively, and first and second resonator heads, respectively, that extend from the first and second resonator stalks, respectively, and wherein the PCB further comprises a metalized opening that is between and coupled to the first and second resonator heads.

17. The RF device of claim 16, wherein the PCB further comprises an opening that is between the first and second resonator stalks and is wider than the metalized opening.

18. The RF device of claim 16, wherein the filter bank comprises a conductive housing that comprises an inner wall that is between the first of the plurality of RF filters and a second of the plurality of RF filters, and wherein the inner wall is between the feed board and the PCB.

19. The RF device of claim 16, wherein each of the plurality of in-line resonators comprises a first metal layer on a first surface of the PCB and a second metal layer on a second surface of the PCB that is opposite the first surface.

* * * * *